United States Patent
Gormley et al.

(10) Patent No.: US 9,313,792 B2
(45) Date of Patent: Apr. 12, 2016

(54) WIRELESS MULTI-SITE CAPACITY COORDINATION

(71) Applicant: Eden Rock Communications, LLC, Bothell, WA (US)

(72) Inventors: Eamonn Gormley, Bothell, WA (US); Chaz Immendorf, Bothell, WA (US); Tim Treptow, Bothell, WA (US)

(73) Assignee: Nokia Solutions and Networks Oy, Espoo (FI)

( * ) Notice: Subject to any disclaimer, the term of this patent is extended or adjusted under 35 U.S.C. 154(b) by 164 days.

(21) Appl. No.: 13/856,416

(22) Filed: Apr. 3, 2013

(65) Prior Publication Data
US 2013/0260777 A1  Oct. 3, 2013

Related U.S. Application Data

(60) Provisional application No. 61/619,417, filed on Apr. 3, 2012.

(51) Int. Cl.
*H04W 72/00* (2009.01)
*H04W 72/04* (2009.01)
*H04W 72/08* (2009.01)

(52) U.S. Cl.
CPC ........ *H04W 72/0473* (2013.01); *H04W 72/085* (2013.01)

(58) Field of Classification Search
CPC .......... H04W 72/0473; H04W 72/085; H04W 72/082; H04W 52/243; H04W 72/0453; H04W 72/04; H04W 28/08; H04W 52/343; H04W 52/244; H04L 5/0032; H04L 5/0057; H04L 5/0062

USPC ........................................................ 455/452.1
See application file for complete search history.

(56) References Cited

U.S. PATENT DOCUMENTS

| | | | | |
|---|---|---|---|---|
| 2006/0094363 | A1* | 5/2006 | Kang et al. | 455/63.1 |
| 2007/0105561 | A1* | 5/2007 | Doetsch et al. | 455/450 |
| 2009/0227261 | A1* | 9/2009 | Tiirola | H04W 16/10 |
| | | | | 455/450 |
| 2010/0279700 | A1 | 11/2010 | Kim et al. | |
| 2011/0235598 | A1* | 9/2011 | Hilborn | 370/329 |

(Continued)

FOREIGN PATENT DOCUMENTS

| | | |
|---|---|---|
| WO | WO 2007/023043 A1 | 3/2007 |
| WO | WO 2008/003815 A1 | 1/2008 |

(Continued)

OTHER PUBLICATIONS

International Search Report and Written Opinion for PCT/US2013/035179, filed on Apr. 3, 2013.

*Primary Examiner* — Timothy Pham

(57) ABSTRACT

Wireless multi-site capacity coordination includes calculating a total interference impact metric for a reference cell, determining a distribution of power resources for the reference cell and a plurality of neighboring cells, and allocating the power resources to sub-bands for the reference cell and the plurality of neighboring cells. Calculating the total interference impact metric may include determining a number of resources assigned to a reference cell within time period T, and calculating user equipment (UE) interference metrics for each UE attached to each of a plurality of neighboring cells which have UE which experience interference from the reference cell attached.

25 Claims, 12 Drawing Sheets

(56) References Cited

U.S. PATENT DOCUMENTS

2012/0238263 A1* 9/2012 Caretti .................. H04W 16/10
455/426.1
2014/0295873 A1* 10/2014 Lunden et al. ................ 455/454

FOREIGN PATENT DOCUMENTS

| WO | WO 2011/051981 A1 | 5/2011 |
| WO | WO 2011/161539 A2 | 12/2011 |

* cited by examiner

ND MULTI-SITE CAPACITY COORDINATION

WIRELESS MULTI-SITE CAPACITY COORDINATION

CROSS-REFERENCES TO RELATED APPLICATIONS

This application claims priority to U.S. Provisional Application. No. 61/619,417 which was filed on Apr. 3, 2012.

BACKGROUND OF THE INVENTION

In a cellular wireless network such as GSM, UMTS, LTE, the number of user equipment terminals (UEs) that are attached to each of the cells in the network can vary substantially. In a conventional network, a UE is typically attached to the cell from which it receives the strongest signal.

The maximum downlink data throughput that can be achieved by a UE depends on several factors. For example, the amount of co-channel interference significantly impacts throughput. The amount of interference is affected by the transmission power of neighboring cells, the path loss between the UE and the neighbor cells and the activity level of the neighbor cells.

The total number of active UEs that are being simultaneously served by a cell also affects network performance. When a cell serves more and more UEs, each UE receives a correspondingly smaller share of the fixed amount of wireless resources. In other words, the performance of a particular cell is inversely proportional to the number of active UE attached to the cell.

Conventional attempts to improve network performance have involved static allocation of various transmission power levels to different frequency slots, and allocating lower transmission power based on UE location. However, while static allocation can have a positive effect, it does not adequately account for dynamic elements of the network.

BRIEF SUMMARY OF THE INVENTION

Embodiments of the present invention are directed to methods and systems for wireless multisite capacity coordination to facilitate a more equitable distribution of wireless resources so that the interference seen by users on cells serving larger numbers of active user equipment is decreased, leading to an improvement in performance for those cells. In an embodiment, the interference reduction is achieved by instructing cells serving smaller numbers of user equipment and/or those that cause higher levels of co-channel interference to neighbor cells to reduce transmit power and/or to not transmit at all on certain time and/or frequency resources.

In an embodiment a system for improving the performance of a wireless communication network, the method includes a processor and a non-transitory computer readable medium with computer executable instructions stored thereon which, when executed by the processor performing a method including calculating a total, interference impact metric for a reference cell, determining a distribution of power resources for the reference cell and a plurality of neighboring cells, and allocating the power resources to sub-bands for the reference cell and the plurality of neighboring cells.

The non-transitory computer readable medium may include additional instructions which, when executed by the processor, cause the processor to determine a number of resources assigned to the reference cell within time period T, and calculate user equipment (UE) interference metrics for each UE attached to each of a plurality of neighboring cells. Each of the neighboring cells may have attached UE which experiences interference from the reference cell.

In an embodiment, calculating the total interference impact metric for the reference cell comprises calculating raw interference metrics for each neighboring cell, determining a total number of active UEs for each neighboring cell, calculating a total amount of resources used by each neighboring cell during the time period T, calculating a percentage of resources used by each neighboring cell during the time period T, calculating an active user multiple for each neighboring cell, multiplying the raw interference metrics for each neighboring cell by the active user multiple for each neighboring cell to determine individual interference impact metrics, and summing the individual interference impact metrics.

Calculating the UE interference metrics may further comprise counting a number of resources assigned to each neighboring cell during the time period. T, calculating an exponent value from RSSI measurements of the reference cell and each neighboring cell, and calculating UE interference metrics based on the exponent value. An exponent value from RSSI measurements may be calculated according to the following equation:

$$R_{Util(i)} = \frac{R_{T(i)}}{R_{Max}}$$

in which RSSIdB(eNodeB$_{c(i)}$) represents received signal strength information (RSSI) values received at a UE from the neighboring cell to which the UE is attached, and RSSIdB(eNodeB$_R$) represents an RSSI value received at a UE from the reference cell. The UE interference metrics may be calculated based on the exponent value according to the following equation:

UE Interference Metric=(numResources)*$e^{exp\_value}$ in which numResources is a number of physical resources used by the UE during the time period T.

In an embodiment, the percentage of resources $R_{Util(i)}$ used by the i'th neighboring cell is calculated according to the following equation:

$$M_{(i)} = \max\left(\left(R_{Util(i)} * \frac{A_{N(i)} - x}{A_R + 1}\right)^3, 0\right)$$

in which $R_{T(i)}$ is a total number of wireless resources allocated to all UEs attached to the neighboring cell i during measurement period T, and $R_{max}$ is a maximum number of wireless resources than can be allocated to UEs by neighboring cell i during the time period T. The non-transitory computer readable medium may include additional instructions which, when executed by the processor, cause the processor to, after calculating the interference impact metric, add each neighboring cell to a list of neighbor cells for the reference cell. The list of neighbor cells may be used to determine the distribution of power resources.

In an embodiment, calculating an active user multiple $M_{(i)}$ for each neighboring cell is conducted according to the following equation:

$$M_{(i)} = \max\left(\left(R_{Util(i)} * \frac{A_{N(i)} - x}{A_R + 1}\right)^3, 0\right)$$

in which $R_{Util(i)}$ is the airlink utilization percentage of neighboring cell i, $A_{N(i)}$ is a number of UE attached to the neighboring cells, $A_R$ is a number of active UE attached to the reference cell, and x is a number of active UE which are attached to neighboring cell i.

Various embodiments of the present invention may be implemented as a method, a system, or as instructions on a non-volatile computer readable medium. The scope of the present invention is not limited by the embodiments described herein; rather, the embodiments are provided and described in order to facilitate clear understanding through specific examples.

DETAILED DESCRIPTION OF THE INVENTION

Embodiments of the present invention may involve a number of hardware and software components in a wireless network. The invention may be embodied in a networked computer system having a network topology, one or more Network Resource Controller, a network base station, and a plurality of User Equipment terminals (UEs). The following section describes these and other hardware and software components according to embodiments of the present invention.

Figure 1:
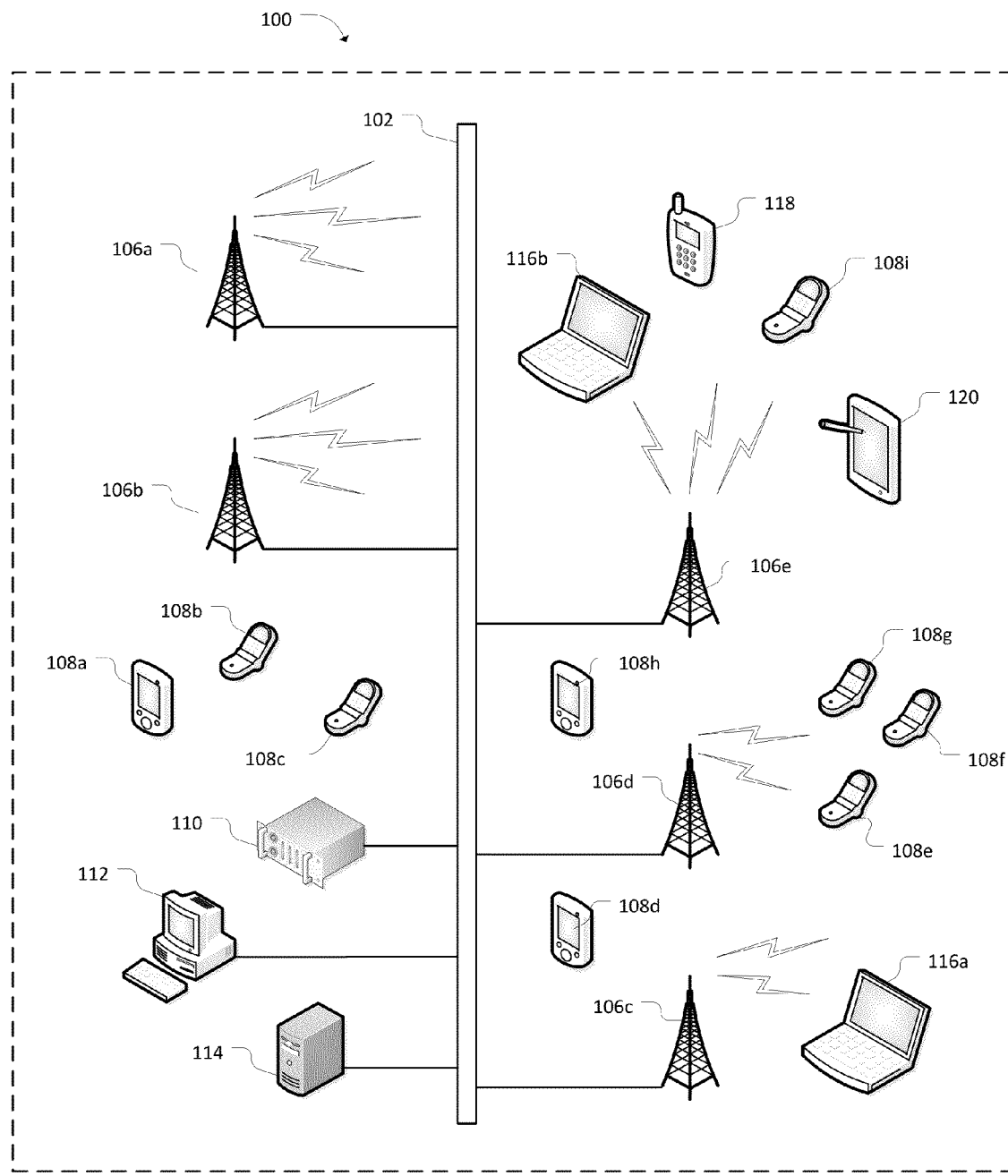
FIG. 1 illustrates a networked computing system according to an embodiment of the present invention.

In accordance with an exemplary embodiment of the present invention. FIG. 1 illustrates a networked computing system 100 including various wired and wireless computing devices that may be utilized to implement any of the wireless multisite capacity coordination processes associated with various embodiments of the present invention. These processes may include, but are not limited to network communications state determinations such as interference metric determinations, network resource monitoring, neighboring cell interference rankings, and sub-band transmit power configuration processes.

A networked computing system 100 may include a group of service provider controller devices 110, 112, and 114, any of which may be Network Resource Controllers (NRCs) or have NRC functionality; network base stations 106a-e any of which may be NRCs or have NRC functionality, that may share overlapping wireless coverage with one or more neighboring base stations within a particular region of the networked computing system 100; multiple UE including: cell phone/PDA devices 108a-i, laptop/netbook computers 116a-b, handheld gaming units 118, electronic book devices or tablet PCs 120, and any other type of common portable wireless computing device that may be provided with wireless communications service by any of the network base stations 106a-e; and a data communications network 102 including a backhaul portion that can facilitate distributed network communications between any of the network controller devices 110, 112, and 114 and any of the network base stations 106a-e.

As would be understood by those skilled in the Art, in most digital communications networks, the backhaul portion of a data communications network 102 may include intermediate links between a backbone of the network which are generally wireline, and sub networks or network base stations 106a-e located at the periphery of the network. For example, cellular user equipment (e.g., any of user equipment 108a-i, 116a-b, 118, and 120) communicating with one or more network base stations 106a-e may constitute a local sub network. The network connection between any of the network base stations 106a-e and the rest of the world may initiate with a link to the backhaul portion of an access provider's communications network 102 (e.g., via a point of presence).

A Network Resource Controller (NRC) is a physical entity that may include software components. An NRC may facilitate all or part of the wireless multisite capacity coordination processes associated with various embodiments of the present invention, in accordance with an embodiment of the present invention, an NRC that performs a particular wireless multisite capacity coordination process may be a physical device, such as a network controller device 110, 112, and 114 or a network base station 106a-e. In yet another embodiment, an NRC that performs a particular wireless multisite capacity coordination process may be a logical software-based entity that can be stored in the volatile or non-volatile memory or memories, or more generally in a non-transitory computer readable medium, of a physical device such as a network controller device 110, 112, and 114, or a network base station 106a-e.

In accordance with various embodiments of the present invention, the NRC has presence and functionality that may be defined by the processes it is capable of carrying out. Accordingly, the conceptual entity that is the NRC may be generally defined by its role in performing processes associated with various wireless multisite capacity coordination processes. Therefore, depending on the particular embodiment, the NRC entity may be considered to be either a physical device, and/or a software component that is stored in the computer readable media such as volatile or non-volatile memories of one or more communicating device(s) within a networked computing system 100.

In an embodiment, any of the service provider controller devices 110, 112, and 114, and/or network base stations 106a-e (optionally having NRC functionality or considered to be a NRC) may function independently or collaboratively to implement any of the interference mitigation processes associated with various embodiments of the present invention. Further, any of the interference mitigation processes may be carried out via any common communications technology known in the Art, such as those associated with modern Global Systems for Mobile (GSM), Universal Mobile Telecommunications System (UMTS), Long Term Evolution (LTE) network infrastructures, etc.

In accordance with a standard GSM network, any of the service provider controller devices 110, 112, and 114 (NRC devices or other devices optionally having NRC functionality) may be associated with a base station, controller (BSC), a mobile switching center (MSG), or any other common, service provider control device known in the art, such as a radio resource manager (RRM). In accordance with a standard UMTS network, any of the service provider controller devices 110, 112, and 114 (optionally having NRC functionality) may be associated with a network resource controller (NRC), a serving GPRS support node (SGSN), or any other common service provider controller device known in the art, such as a radio resource manager (RRM). In accordance with a standard LTE network, any of the service provider controller devices 110, 112, and 114 (optionally having NRC functionality) may be associated with an eNodeB base station, a mobility management entity (MME), or any other common service provider controller device known in the art, such as an RRM.

In an embodiment, any of the service provider controller devices 110, 112, and 114, the network base stations 106a-e, as well as any of the user equipment 108a-i, 116a-b, 118, and 120 may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. In an embodiment, any of the service provider controller devices 110, 112, and 114, or any of the network base stations 106a-e may employ any number of common server, desktop, laptop, and personal computing devices.

In an embodiment, any of the user equipment 108a-i, 116a-b, 118, and 120 may be associated with any combination of common mobile computing devices (e.g., laptop computers, netbook computers, tablet computers, cellular phones, PDAs, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and powerline cable, along with any other wireless communication technology known in the art. In an embodiment, any of the service provider controller devices 110, 112, and 114, the network base stations 106a-e, and user equipment 108a-i, 116a-b, 118, and 120 may include any standard computing software and hardware necessary for processing, storing, and communicating data between each other within the networked computing system 100. The computing hardware realized by any of the network computing system 100 devices (e.g., any of devices 106a-e, 108a-i, 110, 112, 114, 116a-b, 118, and 120) may include: one or more processors, volatile and non-volatile memories, user interfaces, transcoders, modems, wireline and/or wireless communications transceivers, etc.

Further, any of the networked computing system 100 devices (e.g., any of devices 106a-e, 108a-i, 110, 112, 114, 116a-b, 118, and 120) may include one or more computer readable media encoded with a set of computer readable instructions, which when executed, can perform a portion of any of the wireless multisite capacity coordination processes associated with various embodiments of the present invention. In context with various embodiments of the present invention, it should be understood that wireless communications coverage associated with various data communication technologies (e.g., network base stations 106a-e) typically vary between different service provider networks based on the type of network and the system infrastructure deployed within a particular region of a network (e.g., differences between GSM, UMTS, LTE, LIE Advanced, and WiMAX based networks and the technologies deployed in each network type).

Figure 2:
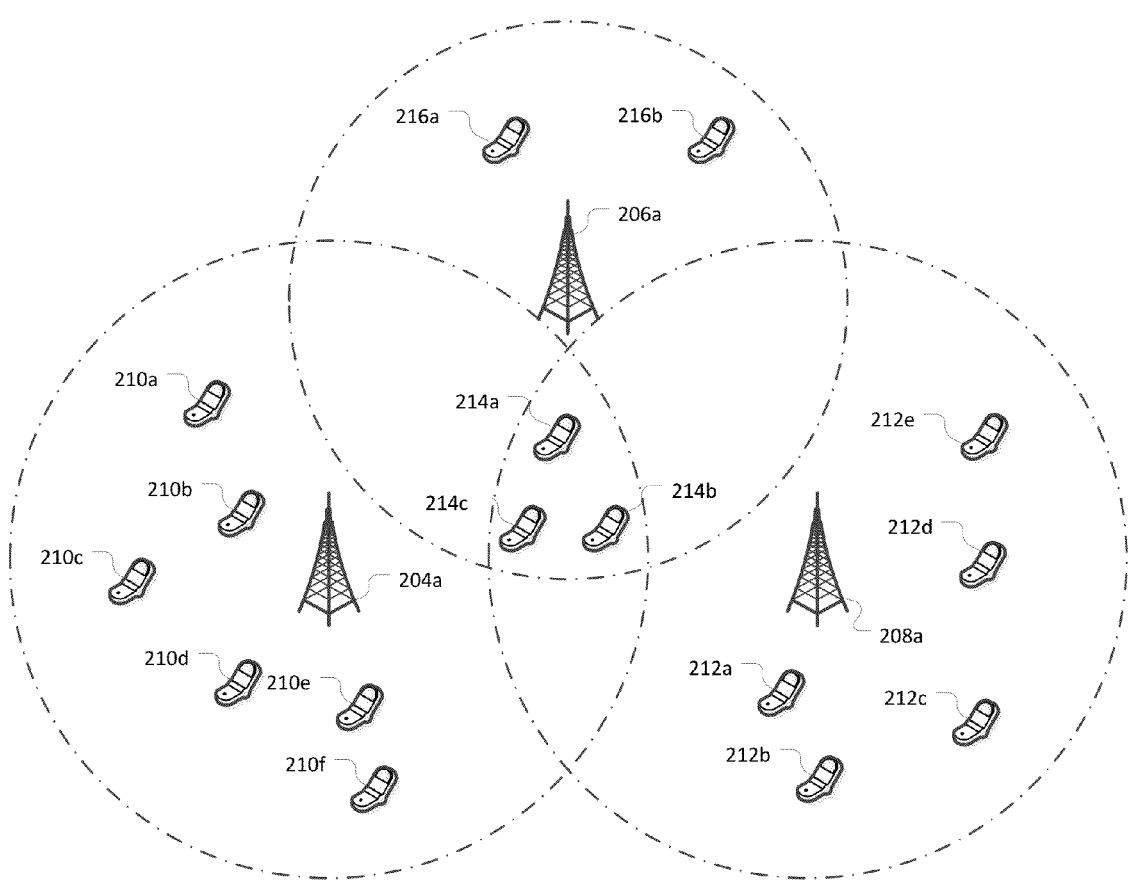
FIG. 2 illustrates a network topology according to an embodiment of the present invention.

FIG. 2 illustrates a network topology 200 including various network base stations 204a, 206a, and 208a having overlapping coverage areas 204b, 206b, and 208b that may be part of a larger data communications network (e.g., 100 of FIG. 1), as well as various user equipment 210a-f, 212a-e, 214a-c, and 216a-b that may be geographically located within the respective coverage areas 204b, 206b, and 208b of any of network base stations 204a, 206a, and 208a. The network base stations 204a, 206a, and 208a and user equipment 210a-f, 212a-e, 214a-c, and 216a-b depicted in FIG. 2 may be representative of any of the network base stations 106a-e or user equipment 108a-i, 116a-b, 118, and 120 depicted in FIG. 1.

In an embodiment, the network topology 200 may be consistent with any common LTE, LTE Advanced, GSM, UMTS, and/or WiWAX based network topology, etc. In particular, the network, topology 200 depicts overlapping cell coverage areas amongst various network cells (e.g., homogeneous or heterogeneous mixtures of network cells) and various user equipment 210a-f, 212a-e, 214a-c, and 216a-b that may be independently and dynamically distributed within the coverage areas 204b, 206b, and 208b of multiple network base stations 204a, 206a, and 208a. In an embodiment, user equipment 210a-f are geographically positioned within the cell coverage area 204b of network base station 204a, and accordingly, user equipment 210a-f may only experience low levels of intercell, co-channel interference from either base station 206a or 208a. Similarly, user equipment 212a-e are geographically located solely within the cell coverage area 208b of network base station 208a, and accordingly, user equipment 212a-e may only experience low levels of intercell, co channel interference from either base station 204a or 206a. User equipment 216a-b are geographically positioned solely within the cell coverage area 206b of network base station 206a, and accordingly, user equipment 216a-b may only experience low levels of intercell co-channel interference from either base station 204a or 208a.

In contrast, user equipment 214a-c are geographically positioned within overlapping cell coverage areas 204b, 206b, and 208b of network base stations 204a, 206a, and 208a. Although user equipment 214a-c may be selectively serviced by one base station such as base station 206a, user equipment 214a-c may also experience substantial intercell co-channel interference from neighboring base stations 204a and 208a. As would be understood by those skilled in the Art, in most real world scenarios, substantial levels of intercell co-channel interference generally occur at the periphery of most cells that are bordered by or sharing a geographic coverage area with one or more neighboring cells. Accordingly, it should be understood that the network topology illustratively depicted in FIG. 2 is only being utilized to depict simplified concepts associated with intercell co-channel interference.

In the scenario of FIG. 2, various service provider controller devices 110, 112, and 114 and/or any of network base stations 204a, 206a, and 208a, as well as any of the distributed user equipment 210a-f, 212a-e, 214a-c, and 216a-b, may be configured to perform a portion of the wireless multisite capacity coordination processes. In an embodiment, network communications state determinations may use any of the user equipment experiencing co-channel interference to measure and/or determine various interference metrics (e.g., carrier power from a serving base station, noise power, interference powers from neighboring base stations, carrier to interference-plus-noise ratio (CINR), etc.) in order to facilitate further wireless multisite capacity coordination operations. In an embodiment, any of the network base stations 204a, 206a, and 208a may carry out various multisite capacity coordination determinations based on feedback from user equipment which generally will include interference metric measurement data (e.g., carrier power from, a serving base station, noise power, interference powers from neighboring base stations, etc). These determinations may facilitate further wireless multisite capacity coordination operations to be carried out by a NRC entity.

In an embodiment, neighboring cell negotiations and determinations relating to various wireless multisite capacity coordination processes may require any pair or group of network base stations 204a, 206a, and 208a (any of which may be acting as an NRC or possess NRC functionality), having overlapping coverage, to communicate with each other in order to facilitate autonomous and/or collective determinations associated with each network base station's 204a, 206a, and 208a preferred, coordinated downlink sub-band transmit power configurations. In other embodiments, neighboring cell negotiations relating to various wireless multisite capacity coordination processes may also occur at a separate NRC entity (not shown) that may be, for example, one or more of service provider controller devices 110, 112, and 114 (optionally acting as NRCs or possessing NRC functionality). In these embodiments the NRC may acquire various metrics from distributed user equipment 214a-c feedback (e.g., carrier power from a serving base station, noise power, interference powers from neighboring base stations, CINR, etc). Based on this feedback, and the results of processes implemented at various base stations, discussed further herein, the controlling NRC may be able to make determinations associated with each network base station's 204a, 206a, and 208a preferred, coordinated downlink sub-band transmit power configurations. The preferred, downlink sub-band transmit power configurations for the base stations 204a, 206a, and 208a are generally configured to equitably distribute capacity across base stations with varying numbers of user equipment by reducing the amount of wireless resources available to base stations providing service to lower numbers of user equipment while maximizing the amount of wireless resources available to base stations providing service to larger numbers of user equipment.

Figure 3:
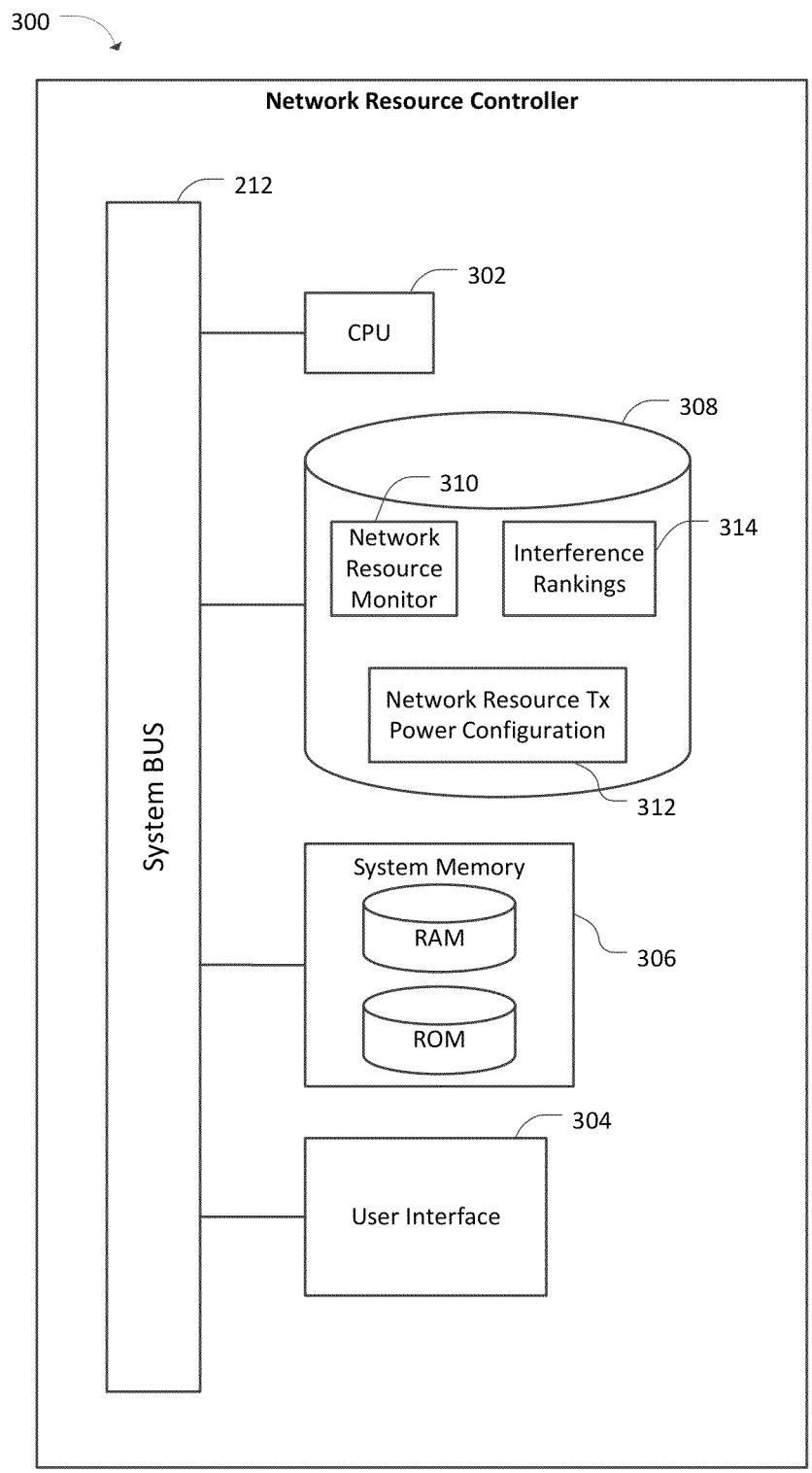
FIG. 3 illustrates a network resource controller according to an embodiment of the present invention.

FIG. 3 illustrates a block diagram view of an NRC 300 that may be representative of any of the network base stations 106a-e or any of the network controller devices 110, 112, and 114 depicted in FIG. 1. In accordance with an embodiment of the present invention, the NRC 300 may be associated with any common base station or network controller device known in the Art, such as an LTE eNodeB (optionally comprising a wireless modem), RRM, MME, RNC, SGSN, BSC, MSC, etc. The NRC 300 may include one or more data processing device including a central processing unit (CPU) 302. In an embodiment, the CPU 302 may include an arithmetic logic unit (ALU, not shown) that performs arithmetic and logical operations and one or more control units (CUs, not shown) that extract instructions and stored content from memory and then execute and/or processes them, calling on the ALU when necessary during program execution. The CPU 302 may be responsible for executing all computer programs stored on the NRC's 300 volatile (RAM) and non-volatile (e.g., ROM) system memories 306 and storage 308. Storage 308 may comprise volatile or non-volatile memory such as RAM, ROM, a solid state drive (SSD), SDRAM, or other optical, magnetic, or semiconductor memory.

The NRC 300 may also include a network interface/optional user interface component 304 that can facilitate the NRC's 300 communication with the backhaul 102 portion or the wireless portions of the network computing system 100 of FIG. 1, and may facilitate a user or network administrator accessing the NRC's 300 hardware and/or software resources. A storage 308 includes a network resource monitor component 310 that can monitor a present state of dynamically changing network environments and the corresponding effect of these changes on various network resources (e.g., on user equipment, communications quality and network throughput), and a network resource transmit power configuration component 312 that can determine downlink sub-band transmit power levels for one or more neighboring network, base stations (e.g., any of network base stations 106a-e). Storage 308 may further include interference rankings 314 for neighboring network base stations and/or the UEs that they service. The interference rankings 314 may include signal strength and/or interference level data, such as the interference impact of one base station's communications on one or more UE serviced by a neighboring base station. The interference rankings 314 may be updated periodically using information received from, for example, UE, base stations, and service provider controller devices 110, 112, and 114. Each of the components of FIG. 7 may be coupled to a system bus 318 that facilitates data communications between all the hardware resources of the NRC 300.

Figure 4:
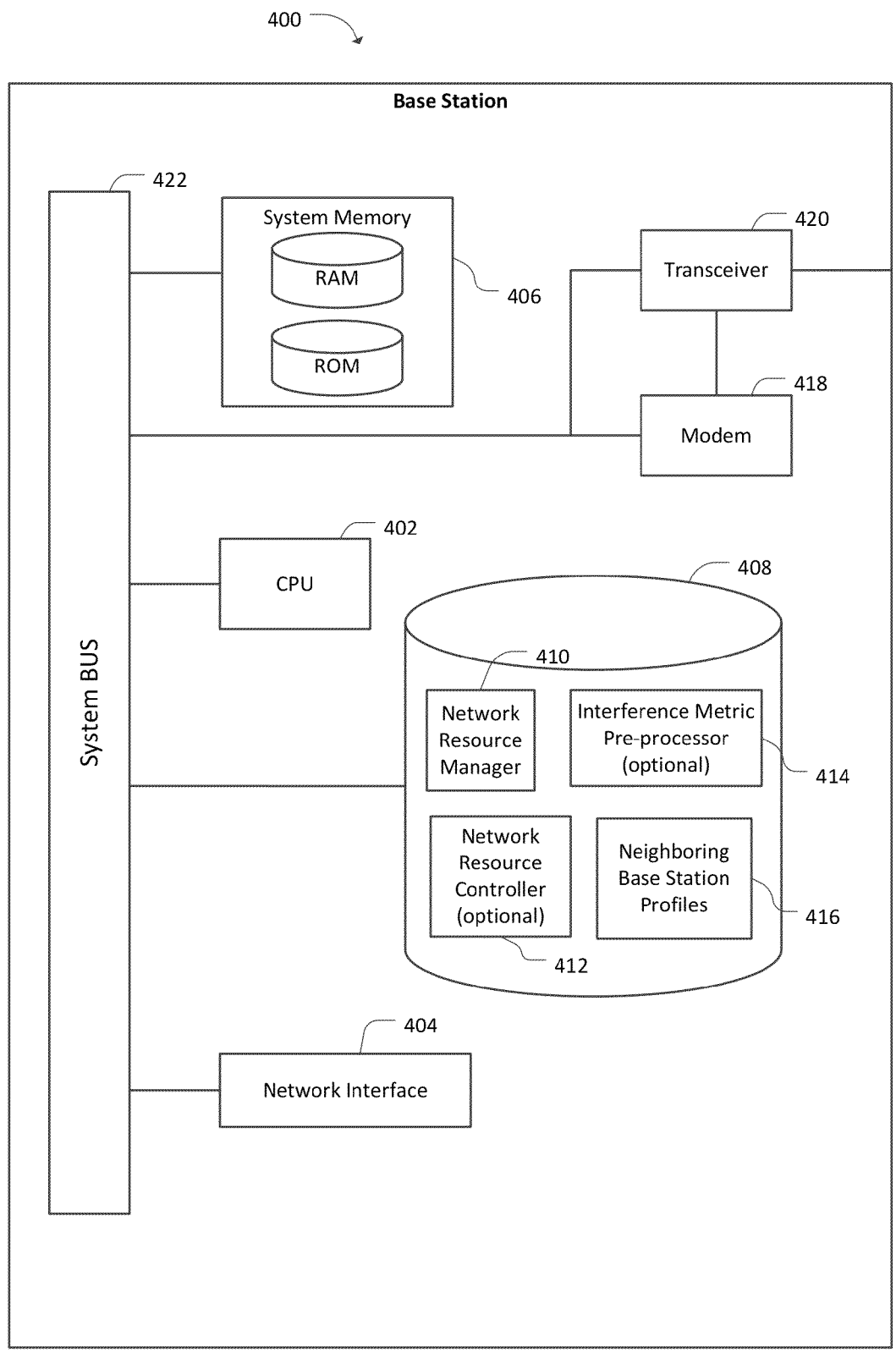
FIG. 4 illustrates a base station according to an embodiment of the present invention.

FIG. 4 illustrates a block diagram view showing components of a network base station 400 according to embodiments of the present invention. The network base station 400 includes components that may be included in any of network base stations 106a-e, 204a, 206a, or 208a, shown in FIG. 1 or FIG. 2.

The network base station 400 may include one or more data processing devices including a central processing unit (CPU) 402. In an embodiment, the CPU 402 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 402 may execute computer programs stored on the network base station's 400 volatile (RAM) and non-volatile (e.g., ROM) system memories 406, or in storage 408. Storage 408 may comprise volatile or non-volatile memory such as RAM, ROM, a solid state drive (SSD), SDRAM, or other optical, magnetic, or semiconductor memory.

The network base station 400 may also include a network interface component 404 that facilitates the network base station's 400 communication with the backhaul 102 portion or the wireless portions of the network computing system 100 of FIG. 1; a modem 418 for modulating an analog carrier signal to encode digital information and for demodulating a carrier signal to decode digital information; a wireless transceiver component 420 for transmitting and receiving wireless communications to and from devices in wireless communication with the networked base station 400, such as any of the wireless enabled computing devices (e.g., any of the network base stations 106a-e, or user equipment 108a-i, 116a-h, 118, and 120 of FIG. 1) of the networked computing system 100; a system bus 422 that facilitates data communications between the hardware resources of the network base station 400; and storage 408, which may include one or more of: a network resource manager component 410, a network resource controller 412, an interference metric preprocessor 414, and a repository of neighboring base station profiles 416.

In accordance with an embodiment of the present invention, the network resource manager component 410 may be configured to communicate and collaborate with one or more of service provider controller devices 110, 112, and 114, and/or neighboring base stations 106a-e, to affect various capacity coordination decisions related to interference. In such an embodiment, the network base station 400, one or more neighboring network base stations, and any of the service provider controller devices 110, 112, and 114 may be acting independently or collectively as a NRC device. In an embodiment, the base station 400 may include an NRC component 412 as a software component of storage 408. The NRC component 412 may include one or more of the components disclosed with respect to storage 308, including network resource transmit power configuration component 312, network resource monitor 310, and interference rankings 314.

In an embodiment where the NRC 300 is a separate entity, the interference metric preprocessor 414 may be capable of performing various wireless multisite capacity coordination processes associated with a NRC 300, in such an embodiment the base station 400 may be capable of performing a portion of the data processing explained with respect to NRC 300 in order to reduce the amount of data flowing between the base station and a separate NRC 300. In other words, in an embodiment, functions of NRC 300 may be shared between preprocessor 414 and a separate NRC unit.

Processes that may be executed by preprocessor 414 include processing at least one of carrier power, reference signal, power, and pilot signal, power from the serving base station 400, processing at least one of noise power, carrier powers, reference signal power, and pilot signal powers from neighboring base stations, calculating CINR, etc. For example the interference metric preprocessor 414 may generate histograms associated with signal strength measurements based on received signal strength measurements (e.g., measured/determined signal strength metric data from its serviced user equipment). This front end processing generally results in less data needing to be sent to a central NRC 300, when the NRC 300 is a separate entity from the base station 400. In such an embodiment, communications bandwidth and centralized NRC 300 processing resources can be conserved by distributing certain tasks to capable network base station 400 resources. In an embodiment, the NRC 300 may request information from the network base station 400, including any new or updated information relating to its own available resources, communications quality states, or the current interference levels caused by neighboring network base stations. Alternatively, the network base station 400 may autonomously provide the NRC 300 with new or updated information it detects or determines on a periodic basis.

In an embodiment, the network base station transceiver 420 may use any common modulation/encoding scheme known in the art, including, but not limited to Binary Phase Shift Keying, Quadrature Phase Shift Keying, and Quadrature Amplitude Modulation. Additionally, the network base station 400 may be configured to communicate with the user equipment (e.g., any of devices 108a-i, 116a-b, 118, and 120) via any Cellular Data Communications Protocol including any common LTE, LTE-Advanced, GSM, UMTS, or WiMAX protocol.

Figure 5:
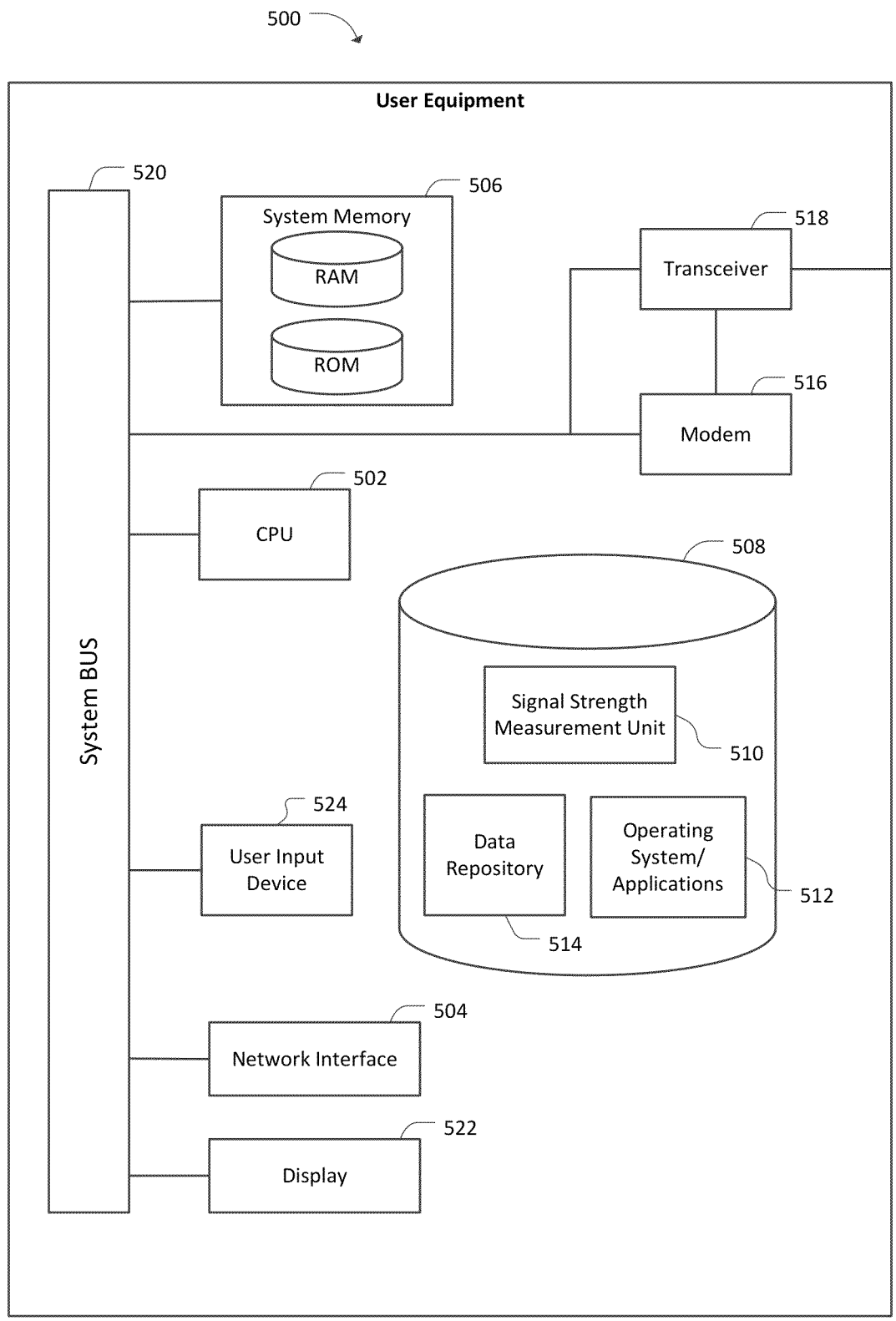
FIG. 5 illustrates user equipment according to an embodiment of the present invention.

FIG. 5 illustrates a block diagram view of user equipment CUE) 500 winch may be in wireless communication with a base station. User equipment 500 may be any of user equipment 108a-i, 116a-b, 118, 120, 210a-e, 212a-e, 214a-c, or 216a-b depicted FIGS. 5 and 6.

In accordance with an embodiment of the present invention, the user equipment 500 may include one or more data processing device such as central processing unit (CPU) 502. In an embodiment, the CPU 502 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 502 may be responsible for executing all computer programs stored on the user equipment's 500 volatile (RAM) and non-volatile (e.g., ROM) system memories, 506 and 508.

The user equipment 500 may also include: a network interface component 504 that can facilitate communication between user equipment 500 and locally connected computing devices (e.g., a Personal Computer); a modem 516 for modulating an analog carrier signal to encode digital information and for demodulating a carrier signal to decode digital information; a wireless transceiver component 518 for transmitting and receiving wireless communications to and from any of the wireless enabled computing devices (e.g., any of the network base stations 106a-e of FIG. 1) of the networked computing system 100; a system bus 520 that facilitates data communications between hardware resources of the user equipment 500; an optional display unit 522 to display text or graphics information; an optional user input device 524 such as a keyboard, mouse, or touch-screen; and a storage 508 which may include: a signal strength measurement unit 510, an operating system/applications repository 512, and a data, repository 514 storing various user equipment data.

In an embodiment, the signal strength measurement unit 510 is capable of measuring various communications information associated with interference metric data, such as carrier power, reference signal power, pilot signal power, etc. from a serving base station, noise power, interference powers (e.g., carrier power, reference signal power or pilot signal power, etc) from neighboring base stations, etc. Further, the signal strength measurement unit 510 may also be capable of calculating CINR data based on the measured interference metric data cited above. The measured signal strength metric data and the optional calculated CINR data may be collectively referred to herein as either signal strength measurement data and/or interference metric data.

In various embodiments, CINR calculations, including calculations based on measurements of base station and interfering base station signal strength, may occur at a network base station 400, a separate NRC 300, NRC components within a base station 400, or a combination of devices. The signal strength measurement unit 510 may be capable of calculating both an aggregate CINR (ratio of the carrier power to the sum of the interference powers from all interfering base stations) and an individual interfering base station CINR (ratio of the carrier power to the interference power of a single base station).

The data repository 514 may be utilized by the user equipment 500 to store various signal strength metric data, including determined CINR data. In an embodiment, this data may be periodically transmitted to a NRC entity or a base station having NRC functionality. Alternately, the NRC may periodically request and acquire the interference metric data from the user equipment 500.

In a cellular wireless network using a standard such as GSM, UMTS, LTE, and the like, the number of UEs that are attached to each of the base stations in the network can vary substantially. A network topology may include a plurality of base stations, each of which may be attached to a different number of UEs.

In a wireless network, the number of UEs attached to a particular base station is a function of the number of active users in the base station's coverage area. If a large number of users are closer to a particular base station than its neighbors, the particular base station may have a larger number of UEs attached, to it than its neighbors do, even though some of the UEs are within service range of the neighboring base stations. For example, with reference to elements of FIG. 2, base station 206*a* has less active attached UE than neighboring base stations 204*a* and 208*a*, and UE 214*a-c* are receiving interference from all three base stations, In a simplified example, UE 214*c* and 214*b*, which are attached to base stations 204*a* and 208*a*, respectively, are receiving interference from base station 206*a*. Reducing resources used by base station 206*a* will reduce the interference experienced by UE 214*b-c*. Although the total resources available to base station 206*a* is reduced, base station 206*a* is serving fewer UEs, so even with a reduced number of resources, these UEs may still see above average levels of performance. A process for coordinating a plurality of base stations to efficiently allocate resources may be referred to as wireless multisite capacity coordination.

Figure 6:
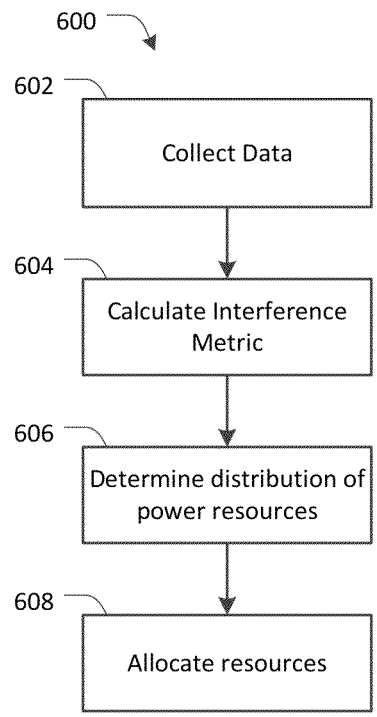
FIG. 6 illustrates a process for coordinating capacity in a multisite wireless network according to an embodiment of the present invention.

An embodiment of a process 600 for wireless multisite capacity coordination is shown in FIG. 6. As seen in FIG. 6, wireless multisite capacity coordination process 600 may include collecting data 602, calculating an interference metric 604, determining power resource allocation 606, and allocating resources 608. Each of these items will be explained in the following description.

Figure 7:
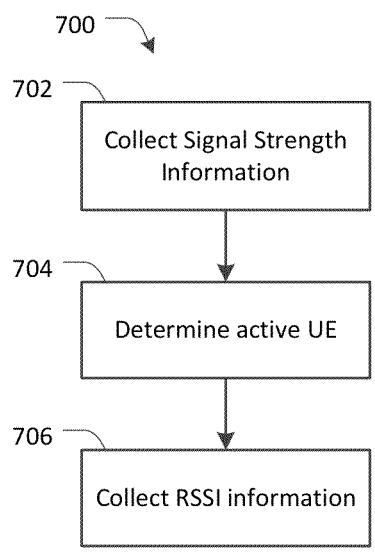
FIG. 7 illustrates a process for collecting data according to an embodiment of the present invention.

Steps that may be taken in a process 700 of collecting data will now be described with respect to FIG. 7. As seen in the figure, a process 700 of collecting data may include a step 702 of collecting signal strength information. In an embodiment, the signal strength information is pilot signal received signal strength indication (RSSI) information. A pilot signal RSSI value may be calculated by a UE that is attached to a base station, and may be calculated according to various techniques known in the art.

Each base station may serve a number of carriers operating on different respective frequencies, and includes a number of antennae which each have a physical coverage area. As used herein, the term "cell" refers to an area served by a single antenna for a given carrier frequency. The coverage area of a cell may relate to the signal strength of a particular carrier signal, such that the boundaries of the cell are defined by points at which the signal strength drops crosses a threshold value, or by points at which the interference rises above a threshold value. Each cell is served by a given base station, so when UE is described as being attached to a cell, it is also attached to the particular base station associated with the cell in addition, activities that are described as being conducted by a cell may be conducted by the base station that is associated with the particular cell. A single base station may serve a plurality of cells, each of which has a separate, and possibly overlapping, coverage area, In an embodiment, a pilot RSSI value is the signal strength in dB of the pilot channel, transmissions that a UE receives from a cell, in LTE systems, for example, this can be the Reference Signal Receive Power (RSRP) measured by the UE for that cell. In UMTS networks this can be the Common Pilot Channel Received Signal Code Power (CPICH RSCP). The RSSI measurement may be independent of whether or not downlink traffic is being transmitted for that cell.

A UE may determine an RSSI value for every cell whose coverage area overlaps with the UE location. A UE may be within a cell if a received signal exceeds a threshold value. Thus, if a UE is in the coverage area of six cells, the UE may calculate a pilot RSSI value for each of the six cells.

The pilot. RSSI value may be expressed in several forms, including a raw decibel value, a number on an arbitrary scale, or another form that reflects magnitude of signal strength. The pilot RSSI value may be determined by the UE and transmitted to a base station to which it is attached, or is otherwise in communication, with the UE. The pilot RSSI value is then received by the network resource controller 300 that may calculate an interference metric in a subsequent operation.

In step 704, the NRC 300 that calculates the interference metric determines a number of active UE for a cell. The number of active UEs for a cell may be distinct from the number of UEs that are attached to the cell. A UE may be attached to a cell but not engaged in active communication with the cell. In general, the number of active UE is less than or equal to the total number of UE that are attached to a cell. The number of active UE attached to a neighboring cell, $eNodeB_{C(i)}$, may be referred to as $A_{N(i)}$, while the number of UE attached to a reference cell, $eNodeB_R$ may be referred to as $A_R$.

In an embodiment, a UE is considered to be an active UE based on an amount of wireless resources consumed by the UE in a predetermined time period T. More specifically, the number of active UEs may be the number of UEs that consume more than a threshold portion $ACT_{MIN}$ of a cell's resources within a measurement, period T. For example, the number of active UEs may be the number of UEs that consume more than 1% of a cell's resources ($ACT_{MIN}=1\%$) within a 250 millisecond interval (T=250 ms), although, embodiments of the present invention are not limited to these specific examples. Wireless resources can be time, frequency, and power. In LTE, time and frequency resources are known as a resource block. In UMTS, resources can be time and/or power.

In other embodiments, values for measurement period T may be from several milliseconds to several seconds, or longer. Examples of values of T include 10, 25, 100, or 500 milliseconds, one second, five seconds, and one minute. The percentage $ACT_{MIN}$ may refer to a percentage of the total available (maximum) resources that are used. The percentage value may differ across various embodiments.

The number of active UEs for a cell can be referred to as an activity metric, and the activity metric may include more than one time period T. For example, the activity metric may be determined for the most recent 2, 5, 10, or 100 time periods.

In step 706, the NRC 300 that calculates the interference metric collects RSSI information from UE. NRC 300 may collect RSSI data for all active UE attached to each cell 106 in a networked computing system 100.

Figure 8:
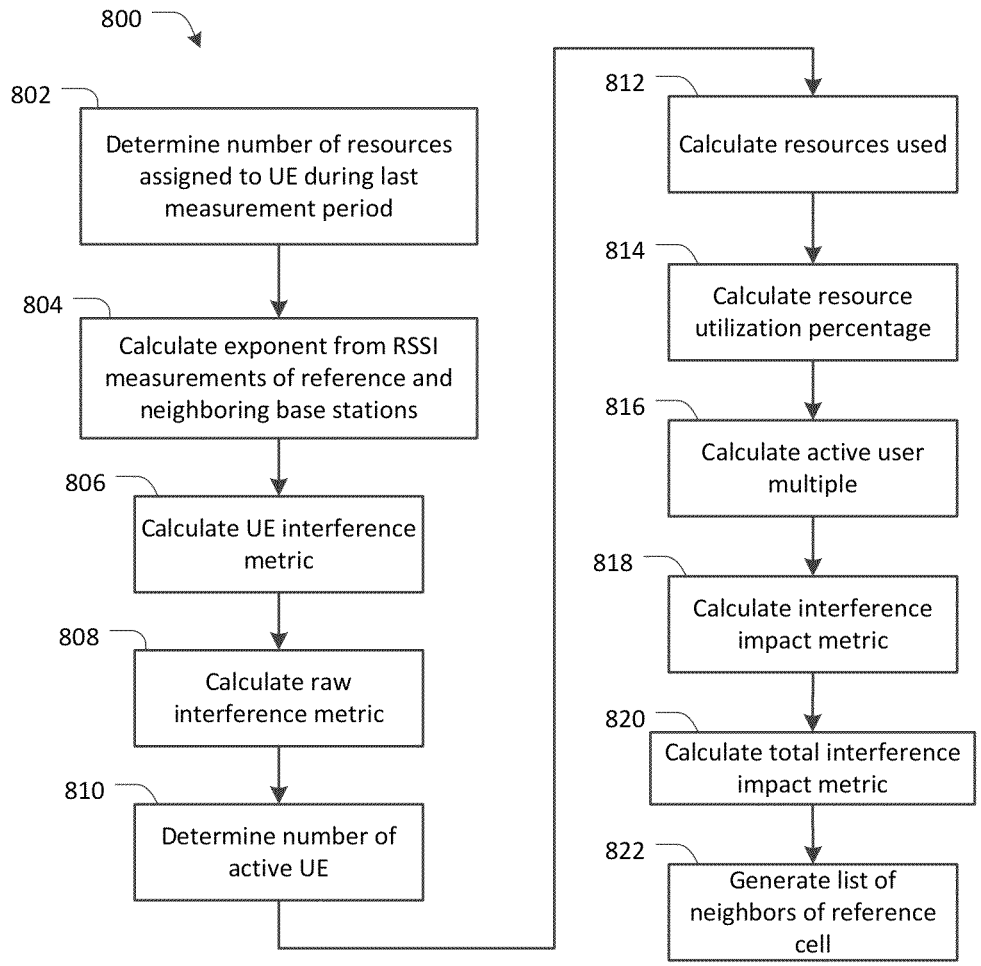
FIG. 8 illustrates a process for calculating an interference metric according to an embodiment of the present invention.

FIG. 8 illustrates a process 800 of calculating interference impact metrics for a reference cell according to an embodiment of the present invention. The interference metrics may be calculated by an NRC 300, components of which may be located at one or more base stations 106 or at a remote location. A total interference impact metric is ultimately calculated with respect to a reference cell, which is expressed in the following sections as $eNodeB_R$.

A total interference impact metric provides an indication of the amount of interference that a given cell is causing to the UEs attached to neighboring cells. The total interference metric may take into account one or more of the following factors: 1) interference caused by a reference cell to active UEs attached to neighboring cells, 2) the amount of wireless resource utilization of neighboring cells, and 3) the number of active UEs being served by neighboring cells.

Furthermore, a total interference impact metric may have one or more of the following characteristics. First, a larger amount of interference seen by UEs being served by neighboring cells from the given cell may lead to a larger total interference impact metric. Second, a larger wireless resource utilization percentage of neighboring cells may lead to a larger total, interference impact metric. And third, the magnitude of the total interference impact metric for a particular cell may increase with an increase in the number of active UEs that cell is causing interference to.

Embodiments of the present invention may calculate a UE interference metric for each neighboring cell of a reference cell, $eNodeB_R$. A neighboring cell, which is expressed as $eNodeB_{C(i)}$, is a cell that has UEs attached to it which experience interference from reference cell $eNodeB_R$. The "C" notation comes from the view that the neighboring cells form a cluster with reference cell $eNodeB_R$. If there are N neighboring cells, the index i ranges from 1 to N. Each reference cell and its neighboring cells may be considered as part of a single cluster. The neighboring cells for a reference cell may change over time, for example by the movement of UE.

Although the term eNodeB is associated with the LTE standard, it should be understood that embodiments of the present invention are not limited to LTE. In other embodiments, the reference cell may be a cellular transceiver that is individually managed to send and receive transmissions to a plurality of UE within its coverage area.

In step 802, the number of resources assigned to $eNode_{C(i)}$ to a particular UE ($UE_i$) during the last measurement period T is determined. In the following equations, the value determined through step 802 is expressed as numResources. In LTE systems, for example, numResources may be the number of physical resource blocks (PRBs) that were used during the last measurement period T. In UMTS, numResources may be the sum of the linear transmit powers of the signals sent in each transmit time interval (TTI).

In step 804, an exponent value is calculated using the RSSI values collected in step 702. In an embodiment, the exponent value is expressed by the following equation 1, $$exp\_value = \frac{12.0 - (RSSIdB(eNodeB_{c(i)}) - RSSIdB(eNodeB_R))}{3.0}$$ [Equation 1]

in which RSSIdB is the RSSI value between $UE_i$ and the relevant cell expressed in a decibel scale.

In step 806, a UE interference metric is calculated. The UE interference metric is calculated as a function of the difference between the signal strength seen by the UE from its serving cell, $eNodeB_{C(i)}$ and the interference received from the reference cell, $eNodeB_R$. The smaller the difference in signal strength between the serving cell $eNodeB_{C(i)}$ and the interfering cell $eNodeB_R$, the larger the interference metric should be. In an embodiment, the interference metric increases exponentially as the difference in RSSI values decreases. When the UE interference metric increases exponentially, substantial performance gains may be achieved compared to having the UE interference metric increase linearly.

Accordingly, in an embodiment, the UE interference metric may be determined according to the following equation 2, using variables that have been defined above:

UE Interference Metric×(numResources)*$e^{exp\_value}$ [Equation 2]

Figure 9:
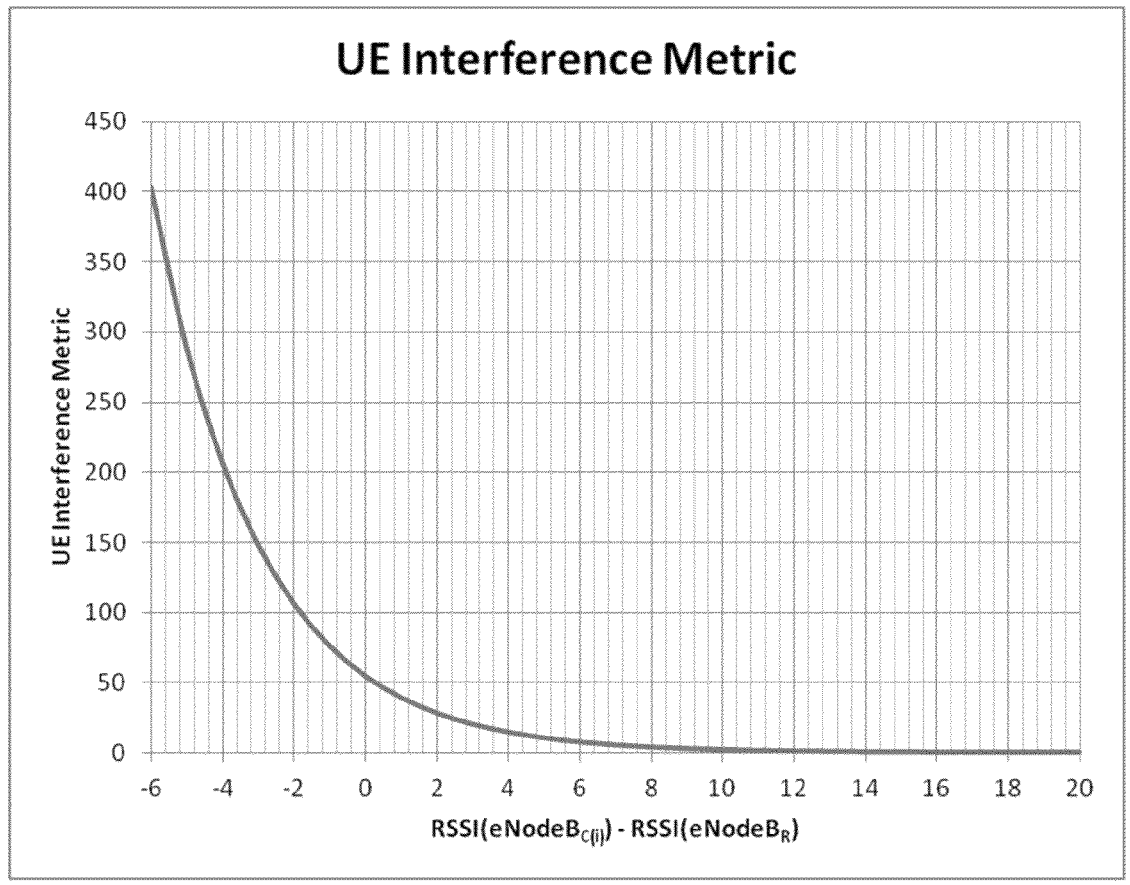
FIG. 9 illustrates a UE interference metric versus an RSSI difference according to an embodiment of the present invention.

FIG. 9 illustrates the relationship between the UE interference metric and the difference in RSSI values between a neighboring cell and a reference cell calculated according to equation 2.

In step 808, a raw interference metric $I_{raw(i)}$ is calculated for each neighboring cell, where i denotes the particular cell 1 to N. The raw interference metric may be calculated by adding the UE interference metric for every active UE attached to neighboring cells $eNodeB_{C(i)}$. Thus, raw interference metric $I_{raw(i)}$ may be calculated for every neighboring cell.

In step 810, a total number of active UE which are attached to each neighboring cell $eNodeB_{C(i)}$ is determined. In an embodiment, this number is referred to as $A_{N(i)}$, and obtaining the number is described above with respect to step 704. Next, in step 812, a total number of resources used $R_{T(i)}$ is determined for each neighbor node. The total number of resources used may be the total resources used by each neighboring cell $eNodeB_{C(i)}$ during measurement period T.

In step 814, a wireless resource utilization percentage $R_{Util(i)}$ is calculated for each, neighboring cell, $eNodeB_{C(i)}$. In an embodiment, the wireless resource utilization percentage $R_{Util(i)}$ is expressed by the following equation 3.

$$R_{Util(i)} = \frac{R_{T(i)}}{R_{Max}}$$ [Equation 3]

in which $R_{max}$ is the maximum number of wireless resources than can be allocated to UEs by a cell during measurement period of duration T. For a constant measurement period T, the value for $R_{max}$ may be constant. A wireless resource utilization percentage may be determined separately by each base station, or by a separate network resource controller component.

In step 816, an active user multiple $M_i$ is calculated for each neighboring cell $eNodeB_{C(i)}$. In an embodiment, the active user multiple is calculated according to the following equation 4, $$M_{(i)} = \max\left(\left(R_{Util(i)} * \frac{A_{N(i)} - x}{A_R + 1}\right)^3, 0\right)$$ [Equation 4]

in which $A_R$ refers to the number of active UE attached to reference cell $eNodeB_R$ as described with respect to step 704. $A_R$ is the number of UEs which exceed threshold $ACT_{MIN}$ during the most recent measurement period for that eNodeB. The total number of Active UEs attached to neighbor cell $eNodeB_{C(i)}$ that is serving UEs receiving interference from $eNodeB_R$, is denoted by $A_{N(i)}$. In other words, $A_{N(i)}$ is the total number of UEs on $eNodeB_{C(i)}$ which exceed threshold $ACT_{MIN}$ during the most recent measurement period for that cell. x is a number of active UEs attached to the neighbor cell, such that if there are x or fewer active UEs on the neighbor cell, then the active user multiple for that neighbor cell will be zero.

The active user multiple formula adjusts the raw interference metric to account for the ratio of active UEs on the reference cell eNodeB$_R$ and the neighbor cell eNodeB$_{C(i)}$, and the utilization percentage of the neighboring cell. In an embodiment, when the ratio of UEs between a neighboring cell and reference cell increases, for example by adding more users to the neighboring cell than the reference cell, the user multiple also increases.

In an embodiment, if there are fewer than a certain number of UEs receiving service from the neighboring cell, the UEs are considered to have adequate service regardless of the levels of interference that may be received from neighboring cells, so the interference metric for the reference cell is set to zero. In equation 4, this function is accomplished by subtracting 5 from the number of users on the neighbor cell. If there are five or fewer users then the first parameter of the max( ) function will be negative, resulting in a value of zero for M$_{(i)}$.

tions in the resource utilization of eNodeB$_R$ are accounted for by the impact that they have on the neighboring cell I$_{MT}$ scores. In other embodiments, other specific processes and policies may be used to arrive at a total interference impact metric that quantifies the interference impact of a reference cell on its neighbors and increases as the impact, increases.

In step 822 a list, referred to herein as List$_{neighbor}$ may be created for each reference cell eNodeB$_R$. The list may include an identifier for every cell that neighbors the eNodeB$_R$, as well as the I$_{MT}$ value for the eNodeB$_{C(i)}$. The I$_{MT}$ values may be added to List$_{neighbor}$ after the IMT values have been calculated for each cell. The list may be stored on a non-transitory computer readable medium. The lists may be compiled during the computation of interference metrics for a reference cell.

The following pseudocode is provided to help illustrate process 800 of calculating a total interference impact metric according to an embodiment, of the present invention:

```
FOR each eNodeB_R
    FOR each neighbor eNodeB (eNodeB_C(i) where i = 1 to N):
        FOR each UE on eNodeB_C(i): Calculate UE interference metric for eNodeB_R:
            Count the number of wireless resources, numResources, UE (e.g., number of
            PRBs) assigned to eNodeB_C(i) during the last measurement period
            Calculate an exponent value from the RSSI measurements of the reference
            eNodeB_R and eNodeB_C(i):
                exp_value = (12.0 − (RSSIdB(eNodeB_C(i)) − (RSSIdB(eNodeB_R) ) )/3.0
            Calculate the UE Interference metric:
                UE Interference metric = (numResources) * e^exp_value
        END FOR
        Calculate the raw interference metric by summing the UE interference metric for each
        UE for that eNodeB (I_raw(i))
        Calculate the total number of active UEs, A_N(i), for eNodeB_C(i)
        Calculate the total of resources, R_T(i) utilized by eNodeB_C(i) in the most recent
        measurement period
        Calculate the percentage of resources, R_util(i), utilized by eNodeB_C(i) in the most recent
        measurement period from R_T(i) and R_MAX
        Calculate the active user multiple, M_i, for this eNodeB_R, eNodeB_C(i) pair
        Calculate the interference impact metric for eNodeB_C(i): I_M(i) = M_i * I_raw(i).
        Add eNodeB_C(i) to the List_neighbor for the eNodeB_R
    END FOR
    Calculate the total interference impact metric, I_MT, for eNodeB_R as the sum of the individual
    interference impact metrics, I_M(i)
END FOR
```

Equation 4 raises the ratio of active users on the neighbor cell to active users on the reference cell to the third power. Thus, as the ratio increases, the multiplier increases at a cubic rate. Such a cubic increase provides improved performance of wireless multisite capacity coordination algorithms compared to a linear increase.

In step 818, an interference impact metric I$_{M(i)}$ is calculated for each neighboring cell eNodeB$_{C(i)}$ of the reference cell eNodeB$_R$. In an embodiment, the interference impact metrics are calculated by multiplying the raw interference metric by the active user multiple according to the following equation 5:

$$I_{M(i)} = M_i * I_{raw(i)} \quad \text{[Equation 5]}$$

For each reference cell, a value for I$_{M(i)}$ may be calculated for each of its neighbors. I$_{M(i)}$ provides a measure of the impact of interference from eNodeB$_R$ on the UEs served by eNodeB$_{C(i)}$.

In step 820, the total interference impact metric, I$_{MT}$, of eNodeB$_R$ on all of its neighboring cells is calculated by summing together each of the I$_{M(i)}$ values as expressed in the following equation 6:

$$I_{MT} = \sum_{1}^{N} I_{M(i)} \quad \text{[Equation 6]}$$

Figure 10:
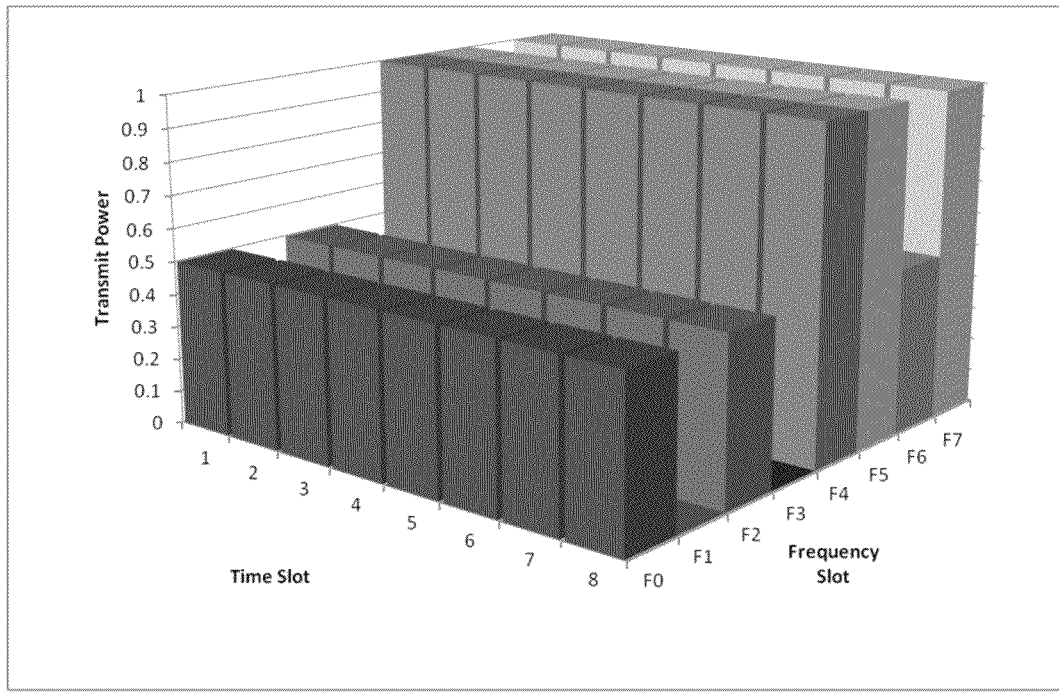
FIG. 10 illustrates variation of transmission power according to frequency in an embodiment of the present invention.

According to equation 6, the value of I$_{MT}$ is independent, of the resource utilization of the reference cell, eNodeB$_R$. Varia- After a total interference impact, metric has been determined for each cell, cell resources may be allocated to improve performance of a cellular network. FIG. 10 illustrates an example of cell resource allocation according to frequency. As seen in FIG. 10, power resources may be adjusted in the frequency domain for a particular cell.

In the embodiment of FIG. 10, power is assigned to three levels: high power (1.0), low power (0.5), and no power (0), and each frequency slot, is transmitted at one of those three levels for all time slots. In other embodiments, the number of divisions may differ. The frequency slots in FIG. 10 represent one or more frequencies that may or may not be contiguous. An example of a frequency slot is a group of LTE PRBs, Such variation is compatible with cellular networks using an orthogonal frequency division multiplexing (OFDM) scheme. Each of the power levels may be a multiplier of a predetermined power such as the maximum transmission power for a cell.

Figure 11:
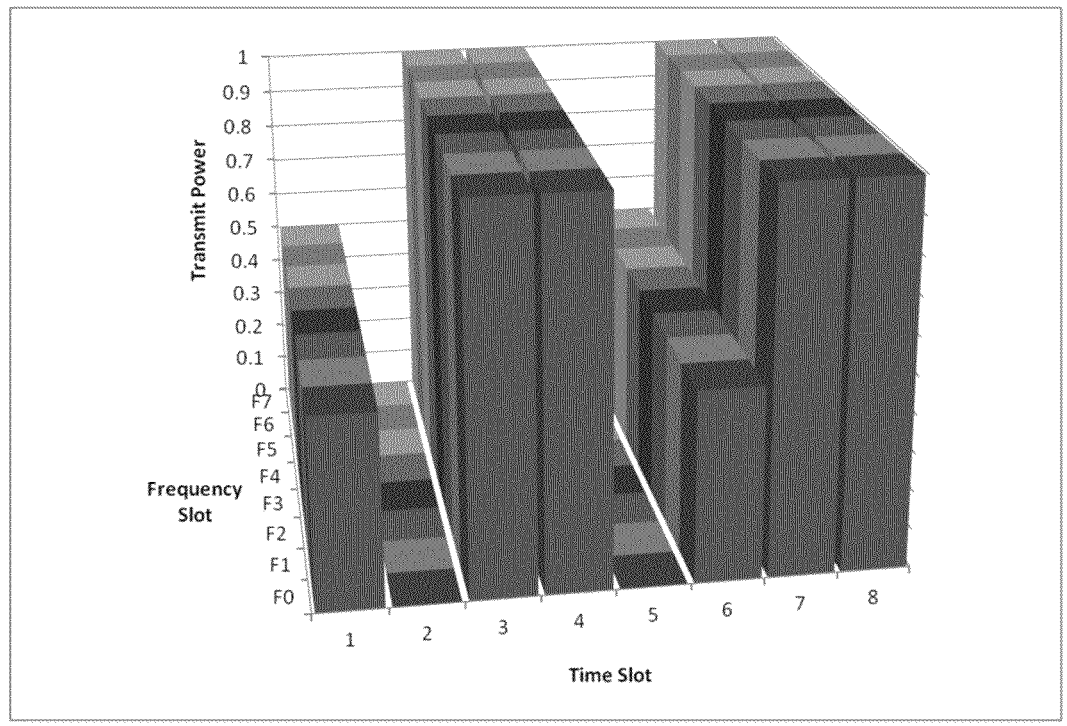
FIG. 11 illustrates variation of transmission power according to time in an embodiment of the present invention.

FIG. 11 illustrates an example of cell resource allocation according to time. In FIG. 11, high, low, and no power resources are assigned to various time slots regardless of frequency. Embodiments that allocate resources according to FIG. 11 are compatible with an OFDM scheme, as well as a code division multiple access (CDMA) scheme.

Figure 12:
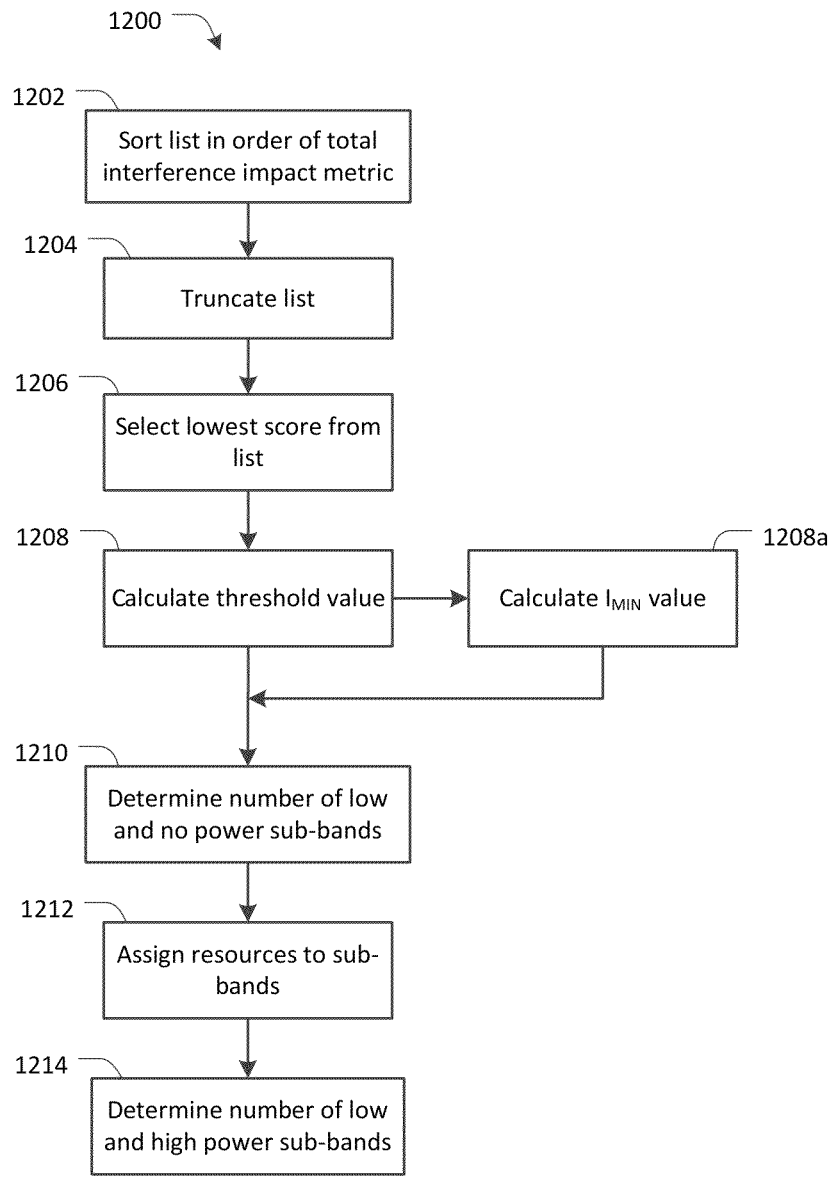
FIG. 12 illustrates a process for determining a distribution of power resources according to an embodiment of the present invention.

FIG. 12 illustrates a process 1200 for determining a distribution of power resources for a reference cell eNodeB$_R$. In an embodiment, a proportion of power resources for each cell in a cellular network is determined before assigning the resources to UE.

The power resources of each, cell are divided into sub-bands. A sub-band is one or more block of resources in a frequency and/or time domain, such as one or more frequency and/or time slot. For example, in FIG. 10, one or more frequency slot F0-F7 may be a sub-band. In FIG. 11, a sub-band may be one or more of time slots 1-8. In another embodiment, a sub-band may be a combination of frequency and time slots, such as frequency slot 10 and time slot 3.

The total number of sub-bands may be referred to as $MAX_{subbands}$. In an embodiment where the sub-bands correspond to time slots, a pattern of sub-bands may repeat every $MAX_{subbands}$, so that $MAX_{subbands}$ corresponds to a cycle. A default power setting for sub-bands may be high power. The process 1200 is used to determine the number of low power sub-bands, $L_{subbands}$, and the number of no power (empty) sub-bands, $N_{subbands}$, for each reference $eNodeB_R$.

In step 1202, a $List_{neighbor}$ for a reference cell is sorted according to total interference impact metric values, hi other words, each $eNodeB_{C(i)}$ in a $List_{neighbor}$ for a given reference cell $eNodeB_R$ is arranged in order according to the $I_{MT}$ value corresponding to the particular $eNodeB_{C(i)}$. In an embodiment, $List_{neighbor}$ may be arranged in descending order of $I_{MT}$ values.

In an embodiment, in step 1204, $List_{neighbor}$ may be truncated so that it only contains a predetermined number of entries. The neighboring cells with lower $I_{MT}$ values are removed from consideration in the remaining steps of process 1200. Although embodiments of the present invention are not limited, to a particular value, in the following description, the predetermined number of entries is live.

In step 1206, the fifth highest $I_{MT}$ value is selected from the list. In an embodiment where the list is truncated to include at least five values, the lowest score is the fifth highest score in the list, which may be referred to as the value 5 thHighestScore. In an embodiment where there are less than five neighbors, then the 5 thHighestScore value is set to zero.

In step 1208, a threshold value K is calculated. The value may be calculated by dividing the lowest $I_{MT}$ value 5 thHighestScore by two. If K is less than a predetermined value, K may be set to the predetermined value $I_{MIN}$. In an embodiment, $I_{MIN}$ is 30,000, so if half of 5 thHighestScore is less than 30,000, K is set to 30,000.

The predetermined value $I_{MIN}$ may be different in other embodiments. Thus, in an embodiment, process 1208a of calculating an $I_{MIN}$ value may be performed. For example, $I_{MIN}$ may be calculated according to the following equation 7, $I_{MIN} = MAX_{subT} * MAX_{timeslots} * MIN_{interference}$
$* MIN_{imbalance} * MIN_{neighbors}$ [Equation 7]

in which $MAX_{subT}$ is the maximum number of sub-band resources available to a cell during measurement period T, $MAX_{timeslots}$ is the maximum number of timeslots during measurement period T, $MIN_{interference}$ is a minimum interference multiplier, $MIN_{imbalance}$ represents a minimum expected ratio between the highest and lowest $I_{MT}$ values of neighboring cells on $List_{neighbor}$, and $MIN_{neighbors}$ represents a typical minimum number of neighboring cells that are serving UEs receiving interference from the reference cell $eNodeB_R$.

In an embodiment, $MIN_{interference}$ may be 3, $MIN_{imbalance}$ may be 2, and $MIN_{neighbors}$ may be 2.5. In other embodiments, these values may be adjusted according to existing and desired characteristics of the wireless network.

Step 1250 includes determining a total number of sub-bands that will be configured to transmit at power levels less than maximum power. For example, in an embodiment where there are three separate power levels of high, low, and no power, step 1210 determines a number of sub-bands that will be assigned low power and no power. The total number of sub-bands may be referred to as SubbandCount, which, is derived according to the following equation 8, $$SubbandCount = FLOOR * \left(2.0 * \ln\left(\frac{I_{MT}}{K}\right)\right)$$ [Equation 8]

in which the FLOOR, function returns an integer value. The SubbandCount value represents the number of sub-bands to be transmitted at power levels less than maximum power. In an embodiment, larger values of the ratio of the $I_{MT}$ for the reference cell and the neighbor cell with the fifth highest $I_{MT}$ results in a larger number of sub-bands of the reference cell being configured to transmit at low power and/or no power.

In step 1212, power resources are assigned to sub-bands. In an embodiment with, three levels of sub-band power, low power sub-bands may be represented as $L_{subbands}$, and no power sub-bands may be represented as $N_{subbands}$. In an embodiment, sub-bands included in SubbandCount may be initially configured as low power sub-bands until a number of sub-bands are assigned in excess of a threshold value. In an embodiment, the threshold value is 37.5% of $Max_{Subbands}$, but embodiments of the present invention are not limited to that particular value. After the value of $L_{subbands}$ exceeds the threshold value, additional sub-bands are designated as no power subbands.

To help illustrate assigning power resources to sub-bands, an example will now be given of an execution of step 1212 in which SubbandCount is six. When the value of $MAX_{subbands}$ is eight, all 8 sub-bands are initially assigned high power. Sub-bands powers are then assigned with low power until the number of sub-bands so assigned reaches a threshold value. In this example, the threshold value of 37.5% is reached when low power is assigned to three sub-bands (3/8=37.5). Thus, low power is assigned to three sub-bands, and no power is assigned to a remaining number of sub-bands to be assigned, which in this example is the total number of sub-bands (8) minus the difference between the value of SubbandCount (6) and the number of $L_{subbands}$ that have already been established (3), which is three. Thus, in this example, high power is assigned to two sub-bands, low power is assigned to three sub-bands, and no power is assigned to the three remaining sub-bands.

Figure 13:
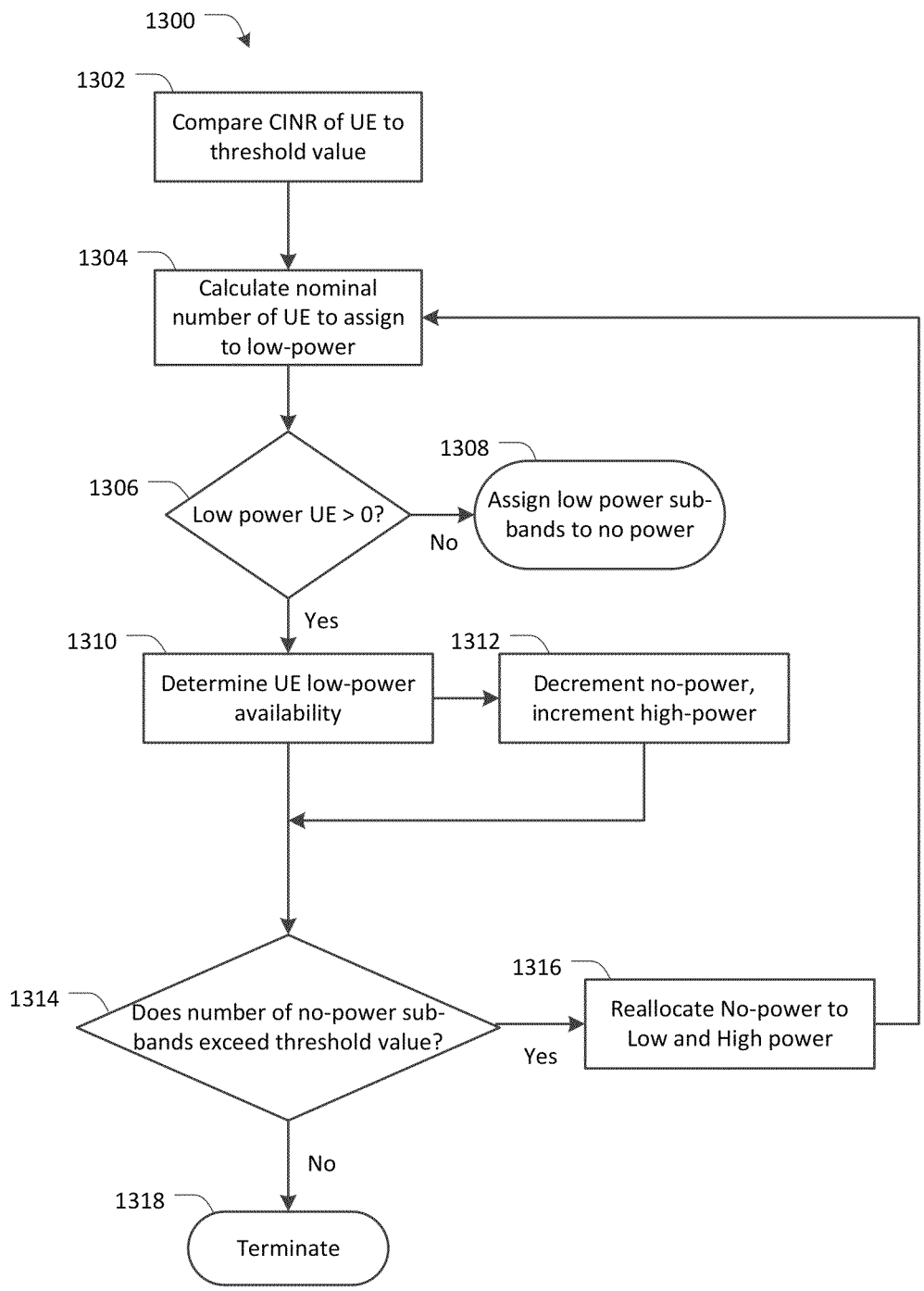
FIG. 13 illustrates a process for determining a number of low and high power sub-bands.

In step 1214, a number of UE to assign to sub-bands is calculated. In particular, for wireless communications systems such as LTE, where UEs must be pre-allocated to receive downlink data on high power or low power sub-bands, a number of UE which are allocated to low power sub-bands is determined before transmission. Step 1214 will be explained in detail with respect to corresponding FIG. 13, which illustrates a process 1300 for determining the number of low and high power sub-bands.

In an embodiment, the UE attached to the reference cell that, have the highest CINRs are allocated to the low power sub-bands. Low power UE may be designated as $UE_{LP}$. However, a UE should have a CINR in excess of a threshold value to be allocated to low power resources. For example, in an embodiment, UE are only assigned to low power resources if they have a CINR value in excess of 10 dB, although embodiments of the present invention are not limited to this specific value.

Thus, in step 1302, a CINR value is compared to a threshold value. If it is determined that no UE have a CINR value that exceeds the threshold value, then high power resources are assigned to all UE and the process may terminate.

In an embodiment using the LTE standard, the CINR value may be the CINR seen on reference signals. In an embodiment in a Universal Mobile Telecommunications System (UMTS), the CINR value may be the CINR seen on the common pilot channel Persons of skill in the art will recognize that other CINR values may be used according to the parameters of the cellular network.

In an embodiment, the nominal number of UEs to be allocated to low power sub-bands is proportional to the ratio of the number of low power sub-bands to the sum of low power and high power sub-bands. In particular, in step 1304, the nominal number of UEs to be allocated to low power sub-bands may be determined according to the following equation 9.

$$UE_{LP} = \text{FLOOR}\left(A_R * Y * \frac{L_{subbands}}{MAX_{subbands} - N_{subbands}}\right) \quad \text{[Equation 9]}$$

in which Y is a multiplier which can be adjusted in various embodiments in order to tune the number of UEs allocated to the low power sub-bands. In an embodiment, Y is 0.8.

In step 1306, a cheek is made to determine whether $UE_{LP}$ is greater than zero. If the value does not exceed zero, then all low power sub-bands are allocated as no power sub-bands and the process terminates.

After calculating the number of low power sub-bands $UE_{LP}$, step 1310 may determine whether there are sufficient UE available with CINR above the threshold value in step 1302 to allocate to the low power sub-bands. If there are not enough suitable UEs to allocate to the low power sub-bands, then in step 1312 the number of low power sub-bands is decremented, and the number of high power sub-bands is incremented.

In an embodiment, step 1314 may establish a threshold percentage of no-power sub-bands, and not allow the number of no-power sub-bands to exceed the threshold value. If the number of no-power sub-bands exceeds the threshold value, in step 1316 no-power sub-bands are reallocated to low-power and high-power sub-bands until the number of no-power sub-bands is lower than the threshold value. In an embodiment, the threshold value is 62.5%, although embodiments of the present invention are not limited thereto.

Although processes 1200 and 1300 have been illustrated and described in a particular order, embodiments of the present invention are not limited to the stated order. Furthermore, in some embodiments, not all of the steps are performed.

The following pseudocode is provided to help illustrate an embodiment of process 1200 of determining a distribution of power resources according to the present invention:

```
FOR each eNodeB (eNodeB_R): // Calculate the number of low power and no power subbands
    Sort the cells in List_neighbor of eNodeB_R in order of the total interference impact metric, I_MT,
    score of each of neighbor cells (highest I_MT score first)
    Truncate List_neighbor so that it contains the six neighbor cells with the highest I_MT scores
    Select the 5^th highest I_MT score, 5thHighestScore, from the list; if there are fewer than 5
    neighbors then 5thHighestScore is set to zero
    Calculate a threshold, K as follows:
        K = (5thHighestScore)/2;
        If K < 30,000:
            K = 30,000
    Determine the total number of sub-bands that will be configured to transmit at low or no
    power
        If (I_MT >= K):
            SubbandCount = FLOOR(2.0 * in(I_MT / K) )
        else:
            SubbandCount = 0;
    Determine the number of low (L_subbands) and no (N_subbands) power sub-bands
        switch (SubbandCount):
            case 0:
            case 1: N_subbands = 0; L_subbands = 0; break
            case 2: N_subbands = 0; L_subbands = 2; break
            case 3: N_subbands = 0; L_subbands = 3; break
            case 4: N_subbands = 1; L_subbands = 3; break
            case 5: N_subbands = 2; L_subbands = 3; break
            default: N_subbands = 3; L_subbands = 3; break
    If more than zero sub-bands are to be configured to transmit at low power on this cell,
    calculate the number of UEs, UE_LP, to assign to the low power sub-bands and update the
    number of no/low power sub-bands if there are not enough suitable UEs to place in the
    low power sub-bands
    If (L_subbands > 0):
        LET UE_CINR>10 = the number of UEs of that eNodeB with (CINR of 10 dB or higher
        While (1):
            UE_LP = FLOOR( A_R * 0.8 * L_subbands / (MAX_subbands - N_subbands) );
            If (UE_LP == 0):
                Nsubbands = Nsubbands + Lsubbands;
                Lsubbands = 0;
                break; // Breaks out of while statement
            If ( (A_R >= 5) AND (UE_CINR>10 >= UE_LP) ):
                break; //Breaks out of while statement
            N_subbands++; L_subbands--;
            If (N_subbands > MAX_subbands * 5/8):
                N_subbands = MAX_subbands * 5/8;
        End while
END FOR
```

After the number of low and no power sub-bands have been determined for each cell, the actual assignment of low and no power sub-bands at each cell takes place. Testing has demonstrated that random assignment of transmit power to sub-bands may result in high levels of network performance. However, better results may be achieved through coordinated allocation to alien sub-bands in frequency and/or time.

Figure 14:
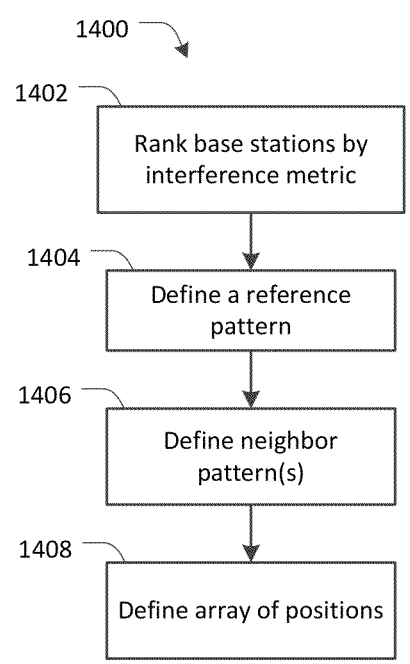
FIG. 14 illustrates a process for coordinated allocation of power resources according to an embodiment of the present invention.

In an embodiment, as illustrated by FIG. 14, a process 1400 of coordinated allocation of power resources is performed. A process 1400 of coordinated allocation of power resources may include a step 1402 of ranking cells by interference metric, a step 1404 of defining a reference cell pattern, a step 1406 of defining a neighboring cell pattern, and a step 1408 of defining an array of positions.

The following pseudocode is provided to help illustrate an embodiment of process 1300 of coordinated allocation of power resources according to the present invention. The pseudocode assumes that sub-bands are distributed in frequency, but persons of skill in the art will recognize that it is readily adapted for embodiments where sub-bands are distributed in time.

```
Record the I_MT score, N_subbands, L_subbands, and UE_LP for each eNodeB.
Rank each eNodeB_R by its I_MT score,
Let Pattern_reference = The pattern of high (H), low (L), and no (X) power sub-bands for
   eNodeB_R (e.g., H X L H H L L X). This pattern will be used by eNodeB_R for its
   transmissions.
Scores are assigned to each of the subbands as follows:
   High power sub-bands, H, are allocated a score of 0
   Low power sub-bands, L, are allocated a score of 1
   No power sub-bands, X, are allocated a score of 2
Pattern_neighbors is defined as the sum of the scores of the neighbor patterns allocated so far.
   The neighbor pattern represents the collective power settings of the neighbor
   eNodeBs of the reference eNodeB_R.
     e.g., Suppose the current value of Pattern_neighbors is [2 0 1 3 0 1 2 0] and a new
     neighbor is assigned Pattern [H X L H X H H L], then the new value of
     Pattern_neighbors would be [2 0 1 3 0 1 2 0] + [0 2 1 0 2 0 0 1] = [2 2 2 3 2 1 2 1]
An array, X-Positions is defined that specifies the order in which no power sub-band
positions are allocated:
     X-Positions[ ] = {0, 4, 1, 5, 2, 6, 3, 7}
An array, L-Positions is defined that specifies the order in which low power sub-band
positions are allocated:
     L-Positions[ ] = {7, 3, 6, 2, 5, 1, 4, 0}
For each reference eNodeB_R (in order of I_MT score starting with the eNodeB_R with the highest
I_MT score):
   IF ( (N_subbands > 0) || ( (L_subbands > 0) ) )
      Subbands = [0 0 0 0 0 0 0 0]
      Pattern_reference = [0 0 0 0 0 0 0 0]
      FOR each element of the List_neighbor:
         Subbands = Subbands + Pattern_neighbors
      END FOR
      // Determine which subbands shall be configured to transmit with no power
      FOR (j = 0; j < N_subbands; j + +):
         position_index = 0xff // undefined position
         FOR (i = 0; i < MAX_subbands; i + +):
            If (Pattern[(X-Positions[i])] = = 0):
               if (position_index = = 0xff):
                  position_index = i;
               elseif (Subbands[ X-Positions[i] ] <
                  Subbands[ X-Positions[position_index] ] ):
                  position_index = i;
         Pattern[X-Positions[position_index]] = 2; // this is the value of a No power
         resource (X)
         Subbands[X-Positions[position_index]] + = 2; // this is the value of a No power
         resource (X)
      // Determine which subbands shall be configured to transmit with low power
      FOR (j = 0; j < L_subbands; j + +):
         position_index = 0xff // undefined position
         FOR (i = 0; i < MAX_subbands; i + +):
            If (Pattern[(L-Positions[i])] = = 0):
               if (position_index = = 0xff):
                  position_index = i;
               elseif (Subbands[L-Positions[i]] < (Subbands[L-Positions[position_index]]):
                  position_index = i;
         Pattern[L-Positions[position_index]] = 1; // this is the value of a Low power
         resource (L)
         Subbands[L-Positions[position_index]] + = 1; // this is the value of a No power
         resource (X)
      // Update neighbor patterns
      FOR each element of the List_neighbor:
         Pattern_neighbors + = Pattern_reference
      END FOR
   END IF
END FOR
```

Embodiments of the present invention may implement processes for wireless multisite capacity coordination. In some embodiments, aspects of the present invention, such as the values of certain variables, can be varied by time of day or based on the subsection of the network in which the wireless multisite capacity coordination is applied.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

What is claimed is:

1. A system in a wireless communication network, the system comprising:
 a processor; and
 a non-transitory computer readable medium with computer executable instructions stored thereon which, when executed by the processor, perform the following method:
 calculating a total interference impact metric for a reference cell based on an interference impact of the reference cell on a plurality of User Equipment (UE) attached to cells that neighbor the reference cell;
 determining a distribution of power resources for the reference cell and the plurality of neighboring cells using the total interference impact metric; and
 allocating the power resources to sub-bands for the reference cell and the plurality of neighboring cells,
 wherein calculating the total interference impact metric for the reference cell comprises:
  determining a total number of active UEs for each neighboring cell;
  calculating an active user multiple for each neighboring cell based on the respective total number of active UEs for each neighboring cell.

2. The system of claim 1, wherein the non-transitory computer readable medium with computer executable instructions stored thereon further includes instructions which, when executed by the processor, cause the processor to perform the following steps:
 determining a number of resources assigned to the reference cell within time period T; and
 calculating UE interference metrics for each UE attached to each neighboring cell, each neighboring cell having attached UE which experience interference from the reference cell.

3. The system of claim 2, wherein calculating the total interference impact metric for the reference cell further comprises:
 calculating raw interference metrics for each neighboring cell;
 calculating a total amount of resources used by each neighboring cell during the time period T;
 calculating a percentage of resources used by each neighboring cell during the time period T;
 multiplying the raw interference metrics for each neighboring cell by the active user multiple for each neighboring cell to determine individual interference impact metrics; and
 summing the individual interference impact metrics.

4. The system of claim 3, wherein the percentage of resources $R_{Util(i)}$ used by the i'th neighboring cell is calculated according to the following equation:

$$R_{Util(i)} = \frac{R_{T(i)}}{R_{Max}}$$

in which $R_{T(i)}$ is a total number of wireless resources allocated to all UEs attached to the neighboring cell i during measurement period T, and $R_{max}$ is a maximum number of wireless resources than can be allocated to UEs by neighboring cell i during the time period T.

5. The system of claim 3, wherein the non-transitory computer readable medium with computer executable instructions stored thereon further includes instructions which, when executed by the processor, cause the processor to perform the following steps:
 after calculating the interference impact metric, adding each neighboring cell to a list of neighbor cells for the reference cell; and
 using the list of neighbor cells to determine the distribution of power resources.

6. The system of claim 3, wherein calculating an active user multiple $M_{(i)}$ for each neighboring cell is conducted according to the following equation:

$$M_{(i)} = \max\left(\left(R_{Util(i)} * \frac{A_{N(i)} - x}{A_R + 1}\right)^3, 0\right)$$

in which $R_{Util(i)}$ is the airlink utilization percentage of neighboring cell i, $A_{N(i)}$ is a number of UE attached to the neighboring cells, $A_R$ is a number of active UE attached to the reference cell, and x is a number of active UE which are attached to neighboring cell i.

7. The system of claim 2, wherein calculating the UE interference metrics further comprises:
 counting a number of resources assigned to each neighboring cell during the time period T;
 calculating an exponent value from RSSI measurements of the reference cell and each neighboring cell; and
 calculating UE interference metrics based on the exponent value.

8. The system of claim 7, wherein calculating an exponent value from RSSI measurements is conducted according to the following equation:

$$\text{exp\_value} = \frac{12.0 - (RSSIdB(eNodeB_{c(i)}) - RSSIdB(eNodeB_R))}{3.0}$$

in which $RSSIdB(eNodeB_{c(i)})$ represents received signal strength information (RSSI) values received at a UE from the neighboring cell to which the UE is attached, and $RSSIdB(eNodeB_R)$ represents an RSSI value received at a UE from the reference cell.

9. The system of claim 7, wherein calculating the UE interference metrics based on the exponent value is conducted according to the following equation:

$$\text{UE Interference Metric} = (\text{numResources}) * e^{\text{exp\_value}}$$

in which numResources is a number of physical resources used by the UE during the time period T.

10. The system of claim 1, wherein calculating a total interference impact metric for the reference cell includes calculating an interference impact metric for each neighbor cell and multiplying the interference impact metrics by an active user multiple, and the active user multiple $M_{(i)}$ for each neighboring cell is conducted according to the following equation:

$$M_{(i)} = \max\left(\left(R_{Util(i)} * \frac{A_{N(i)} - x}{A_R + 1}\right)^3, 0\right)$$

in which $R_{Util(i)}$ is the airlink utilization percentage of neighboring cell i, $A_{N(i)}$ is a number of UE attached to the neighboring cells, and $A_R$ is a number of active UE attached to the reference cell, and x is a number of active UE which are attached to neighboring cell i.

11. The system of claim 1, wherein calculating the total interference impact metric includes:
calculating first interference metrics for each neighboring cell based on resource utilization by each neighboring cell; and
adjusting each first interference using the active user multiple.

12. A method for a wireless communication network, the method comprising:
calculating, by a network controller, a total interference impact metric for a reference cell based on an interference impact of the reference cell on a plurality of User Equipment (UE) attached to cells that neighbor the reference cell by:
determining a total number of active UEs for each neighboring cell; and
calculating an active user multiple for each neighboring cell based on the respective total number of active UEs for each neighboring cell;
determining a distribution of power resources for the reference cell and the plurality of neighboring cells using the total interference impact metric;
allocating the power resources to sub-bands for the reference cell and the plurality of neighboring cells; and
determining a number of UEs to assign to each sub-band of the reference cell and the plurality of neighboring cells.

13. The method of claim 12, further comprising:
determining a number of resources assigned to the reference cell within time period T; and
calculating user equipment (UE) interference metrics for each UE attached to each neighboring cell, each neighboring cell having attached UE which experience interference from the reference cell.

14. The method of claim 13, wherein calculating the total interference impact metric for the reference cell further comprises:
calculating raw interference metrics for each neighboring cell;
calculating a total amount of resources used by each neighboring cell during the time period T;
calculating a percentage of resources used by each neighboring cell during the time period T;
multiplying the raw interference metrics for each neighboring cell by the active user multiple for each neighboring cell to determine individual interference impact metrics; and
summing the individual interference impact metrics.

15. The method of claim 14, wherein calculating an active user multiple $M_{(i)}$ for each neighboring cell is conducted according to the following equation:

$$M_{(i)} = \max\left(\left(R_{Util(i)} * \frac{A_{N(i)} - x}{A_R + 1}\right)^3, 0\right)$$

in which $R_{Util(i)}$ is the airlink utilization percentage of neighboring cell i, $A_{N(i)}$ is a number of UE attached to the neighboring cells, and $A_R$ is a number of active UE attached to the reference cell, and x is a number of active UE which are attached to neighboring cell i.

16. The method of claim 14, wherein the percentage of resources $R_{Util(i)}$ used by the i'th neighboring cell is calculated according to the following equation:

$$R_{Util(i)} = \frac{R_{T(i)}}{R_{Max}}$$

in which $R_{T(i)}$ is a total number of wireless resources allocated to all UEs attached to the neighboring cell i during measurement period T, and $R_{max}$ is a maximum number of wireless resources than can be allocated to UEs by neighboring cell i during the time period T.

17. The method of claim 13, wherein calculating the UE interference metrics further comprises:
counting a number of resources assigned to each neighboring cell during the time period T;
calculating an exponent value from RSSI measurements of the reference cell and each neighboring cell; and
calculating UE interference metrics based on the exponent value.

18. The method of claim 17, wherein calculating an exponent value from RSSI measurements is conducted according to the following equation:

$$\text{exp\_value} = \frac{12.0 - (RSSIdB(eNodeB_{c(i)}) - RSSIdB(eNodeB_R))}{3.0}$$

in which $RSSIdB(eNodeB_{c(i)})$ represents received signal strength information (RSSI) values received at a UE from the neighboring cell to which the UE is attached, and $RSSIdB(eNodeB_R)$ represents an RSSI value received at a UE from the reference cell, and
wherein calculating the UE interference metrics based on the exponent value is conducted according to the following equation:

UE Interference Metric=(numResources)*$e^{exp\_value}$ in which numResources is a number of physical resources used by the UE during the time period T.

19. The method of claim 12, wherein calculating the total interference impact metric includes:
calculating first interference metrics for each neighboring cell based on resource utilization by each neighboring cell; and
adjusting each first interference metric using the active user multiple.

20. A non-transitory computer readable medium with computer executable instructions stored thereon which, when executed by the processor, perform the following method:
calculating a total interference impact metric for a reference cell based on an interference impact of the reference cell on a plurality of User Equipment (UE) attached to cells that neighbor the reference cell by:
determining a total number of active UEs for each neighboring cell; and calculating an active user multiple for each neighboring cell based on the respective total number of active UEs for each neighboring cell;

determining a distribution of power resources for the reference cell and the plurality of neighboring cells using the total interference impact metric;

allocating the power resources to sub-bands for the reference cell and the plurality of neighboring cells; and determining a number of UEs to assign to each sub-band of the reference cell and the plurality of neighboring cells.

21. The non-transitory computer readable medium of claim 20, further comprising computer executable instructions stored thereon which, when executed by the processor, perform the following method:

determining a number of resources assigned to the reference cell within time period T; and calculating user equipment (UE) interference metrics for each UE attached to each neighboring cell, each neighboring cell having attached UE which experience interference from the reference cell.

22. The computer readable medium of claim 21, wherein calculating the UE interference metrics further comprises:

counting a number of resources assigned to each neighboring cell during the time period T;

calculating an exponent value from RSSI measurements of the reference cell and each neighboring cell; and calculating UE interference metrics based on the exponent value.

23. The computer readable medium of claim 20, wherein calculating the total interference impact metric for the reference cell further comprises:

calculating raw interference metrics for each neighboring cell;

calculating a total amount of resources used by each neighboring cell during the time period T;

calculating a percentage of resources used by each neighboring cell during the time period T;

multiplying the raw interference metrics for each neighboring cell by the active user multiple for each neighboring cell to determine individual impact metrics; and summing the individual impact metrics.

24. The computer readable medium of claim 23, wherein calculating an active user multiple $M_{(i)}$ for each neighboring cell is conducted according to the following equation:

$$M_{(i)} = \max\left(\left(R_{Util(i)} * \frac{A_{N(i)} - x}{A_R + 1}\right)^3, 0\right)$$

in which $R_{Util(i)}$ is the airlink utilization percentage of neighboring cell i, $A_{N(i)}$ is a number of UE attached to the neighboring cells, and $A_R$ is a number of active UE attached to the reference cell, and x is a number of active UE which are attached to neighboring cell i.

25. The computer readable medium of claim 23, wherein calculating an exponent value from RSSI measurements is conducted according to the following equation:

$$\exp\_value = \frac{12.0 - (RSSIdB(eNodeB_{c(i)}) - RSSIdB(eNodeB_R)}{3.0}$$

in which $RSSIdB(eNodeB_{c(i)})$ represents received signal strength information (RSSI) values received at a UE from the neighboring cell to which the UE is attached, and $RSSIdB(eNodeB_R)$ represents an RSSI value received at a UE from the reference cell, and wherein calculating the UE interference metrics based on the exponent value is conducted according to the following equation:

UE Interference Metric=(numResources)*$e^{exp\_value}$ in which numResources is a number of physical resources used by the UE during the time period T.

* * * * *